US011817951B2

(12) United States Patent
Li et al.

(10) Patent No.: US 11,817,951 B2
(45) **Date of Patent: *Nov. 14, 2023**

(54) METHOD AND APPARATUS OF SOURCE INDICATION FOR SIDELINK TRANSMISSION IN A WIRELESS COMMUNICATION SYSTEM

(71) Applicant: ASUSTek Computer Inc., Taipei (TW)

(72) Inventors: Ming-Che Li, Taipei (TW); Li-Chih Tseng, Taipei (TW); Wei-Yu Chen, Taipei (TW); Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 53 days.

This patent is subject to a terminal disclaimer.

(21) Appl. No.: 17/505,044

(22) Filed: Oct. 19, 2021

(65) Prior Publication Data

US 2022/0039119 A1 Feb. 3, 2022

Related U.S. Application Data

(63) Continuation of application No. 16/563,475, filed on Sep. 6, 2019, now Pat. No. 11,246,148.

(Continued)

(51) Int. Cl.
*H04W 80/02* (2009.01)
*H04L 1/00* (2006.01)
(Continued)

(52) U.S. Cl.
CPC ....... *H04L 1/0061* (2013.01); *H04W 72/1263* (2013.01); *H04W 72/23* (2023.01);
(Continued)

(58) Field of Classification Search
None
See application file for complete search history.

(56) References Cited

U.S. PATENT DOCUMENTS 10,154,528 B2 12/2018 Van Phan et al.
10,243,764 B2 3/2019 Lindhoff et al.
(Continued)

FOREIGN PATENT DOCUMENTS

CN 103002578 A 3/2013
CN 108432309 A 8/2018
(Continued)

OTHER PUBLICATIONS

Corresponding Indian Patent Application No. 201944035976, Office Action dated Jun. 18, 2021. English Translation.
(Continued)

*Primary Examiner* — Brandon M Renner
(74) *Attorney, Agent, or Firm* — Cooper Legal Group LLC

(57) ABSTRACT

A method and apparatus are disclosed from the perspective of a transmitting device. In one embodiment, the method includes being configured or allocated with an identity, wherein the identity comprises a first part of the identity and a second part of the identity. The method also includes the transmitting device generating a data packet for sidelink transmission, wherein the data packet includes the second part of the identity. Furthermore, the method includes transmitting device generating a control information associated with the data packet, wherein the control information includes the first part of the identity. The method further includes the transmitting device transmits the control information and the data packet.

19 Claims, 29 Drawing Sheets

Related U.S. Application Data

(60) Provisional application No. 62/729,273, filed on Sep. 10, 2018.

(51) Int. Cl.

| | |
|---|---|
| ***H04W 72/1263*** | (2023.01) |
| ***H04W 72/23*** | (2023.01) |
| *H04W 80/06* | (2009.01) |
| *H04W 92/18* | (2009.01) |
| *H04L 27/26* | (2006.01) |

(52) U.S. Cl.
CPC ......... *H04L 27/2602* (2013.01); *H04W 80/02* (2013.01); *H04W 80/06* (2013.01); *H04W 92/18* (2013.01)

(56) References Cited

U.S. PATENT DOCUMENTS

| | | | |
|---|---|---|---|
| 2015/0043455 | A1 | 2/2015 | Miklos et al. |
| 2015/0215903 | A1 | 7/2015 | Zhao et al. |
| 2016/0066303 | A1 | 6/2016 | Zhu et al. |
| 2018/0070264 | A1 | 3/2018 | Saiwai et al. |
| 2018/0213379 | A1 | 7/2018 | Xiong et al. |
| 2018/0263026 | A1 | 9/2018 | Joachim et al. |
| 2018/0324571 | A1 | 11/2018 | Buckley et al. |
| 2020/0037398 | A1 | 1/2020 | Adachi et al. |
| 2020/0068379 | A1 | 2/2020 | Martin et al. |
| 2020/0077460 | A1 * | 3/2020 | Hahn .................... H04W 76/14 |
| 2020/0389900 | A1 | 12/2020 | Lee et al. |

FOREIGN PATENT DOCUMENTS

| | | | |
|---|---|---|---|
| EP | 2986039 | A | 2/2016 |
| JP | 2015185959 | A | 10/2015 |
| TW | 201743652 | A | 12/2017 |
| WO | 2018141833 | A1 | 8/2018 |
| WO | 20200204494 | A1 | 8/2020 |

OTHER PUBLICATIONS

Corresponding Korean Patent Application No. 10-2019-0110835, Office Action dated Jan. 13, 2021. English Translation.

Corresponding Japanese Patent Application No. 2019-163145, Office Action dated Dec. 8, 2020. English Translation.

LG Electronics, "Control design for D2D broadcast communication", 3GPP TSG RAN WG1 Meeting #77, R1-142146, Document for Discussion and Decision, Agenda Item 6.2.5.1.2, May 19-23, 2014, Seoul, Korea.

Corresponding Taiwan Patent Application No. 108132333, Office Action dated Jun. 8, 2020. English Translation.

Corresponding European Patent Application No. 19195875.0, Extended European Search Report dated Jan. 30, 2020.

Corresponding European Office Action citing application No. 19195875.0, dated Jun. 8, 2022, 6 pages.

* cited by examiner

Different deployment scenarios with Single TRP cell

Different deployment scenarios with multiple TRPs Cell

| DCI format | Search Space |
| --- | --- |
| DCI format 5 | For PDCCH: Common and UE specific by C-RNTI<br>For EPDCCH: UE specific by C-RNTI |

FIG. 12 (PRIOR ART)

| DCI format | Search Space |
| --- | --- |
| DCI format 5A | For PDCCH: Common and UE specific by C-RNTI<br>For EPDCCH: UE specific by C-RNTI |

FIG. 13 (PRIOR ART)

| SL index field in DCI format 5A | Indicated value *m* |
| --- | --- |
| '00' | 0 |
| '01' | 1 |
| '10' | 2 |
| '11' | 3 |

FIG. 14 (PRIOR ART)

| Resource reservation field in SCI format 1 | Indicated value *X* | Condition |
|---|---|---|
| '0001', '0010', ..., '1010' | Decimal equivalent of the field | The higher layer decides to keep the resource for the transmission of the next transport block and the value *X* meets $1 \leq X \leq 10$. |
| '1011' | 0.5 | The higher layer decides to keep the resource for the transmission of the next transport block and the value *X* is 0.5. |
| '1100' | 0.2 | The higher layer decides to keep the resource for the transmission of the next transport block and the value *X* is 0.2. |
| '0000' | 0 | The higher layer decides not to keep the resource for the transmission of the next transport block. |
| '1101', '1110', '1111' | Reserved | |

FIG. 15 (PRIOR ART)

| UE transmit antenna selection | Antenna selection mask $< x_{AS,0}, x_{AS,1}, ..., x_{AS,15} >$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK+BPSK | 21 |
| 2b | QPSK+QPSK | 22 |
| 3 | QPSK | 48 |
| 4 | QPSK | $M_{RB}^{PUCCH4} \cdot N_{sc}^{RB} \cdot \left(N_0^{PUCCH} + N_1^{PUCCH}\right) \cdot 2$ |
| 5 | QPSK | $N_{sc}^{RB} \cdot \left(N_0^{PUCCH} + N_1^{PUCCH}\right)$ |

FIG. 20 (PRIOR ART)

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

FIG. 22 (PRIOR ART)

| | DL-SCH | DCI | UL-SCH | UCI | SL-SCH | SCI |
|---|---|---|---|---|---|---|
| CRC scrambling | X | $n_{RNTI}$ | X | X | X | X |
| Scrambling sequence initialization | $n_{RNTI}$, $N_{ID}^{cell}$ | $N_{ID}^{cell}$ | $n_{RNTI}$, $N_{ID}^{cell}$ | $n_{RNTI}$, $N_{ID}^{cell}$ | CRC of PSCCH | 510 |
| Physical channel | PDSCH | PDCCH | PUSCH | PUCCH | PSSCH | PSCCH |

FIG. 24

| Methods for Source ID | | a | b | c1 | c2 | c3 | d | e | f | g |
|---|---|---|---|---|---|---|---|---|---|---|
| PSCCH | SCI | | S1 | S1 | S1 | S1 | | S1 | S1 | |
| | CRC scrambling | S1 | | S2 | S2 | S2 | S1 | | S2 | S |
| | Scrambling sequence initialization | | | | | | | | | |
| PSSCH | TB(higher layer) | S2 | S2 | | S3 | | | | | |
| | CRC scrambling | | | | | S | S2/S | S2/S | S3/S | (S) |
| | Scrambling sequence initialization | (S1) | (S1) | (S) | (S1+S2) /(S) | (S) | (S1)/(S) | (S1)/(S) | (S1+S2) /(S) | (S) |
| Candidates of Source IDs? | | (Y) | | (Y) | (Y) | (Y) | (Y) | (Y) | (Y) | (Y) |

FIG. 25

| Methods for Source ID | | a | a | b | c1 | c2 | c3 | d | d | e | f | g |
|---|---|---|---|---|---|---|---|---|---|---|---|---|
| PSCCH | SCI | | | 8 | 8 | 8 | 8 | | | 8 | 8 | |
| | CRC scrambling | 8 | 16 | | 16 | 8 | 16 | 8 | 16 | | 8 | 24 |
| | Scrambling sequence initialization | | | | | | | | | | | |
| PSSCH | TB(higher layer) | 16 | 8 | 16 | | 8 | | | | | | |
| | CRC scrambling | | | | | | 24 | 16/24 | 8/24 | 16/24 | 8/24 | (24) |
| | Scrambling sequence initialization | (8) | (16) | (8) | (24) | 16/24 | (24) | (8/24) | (16/24) | (8/24) | (16/24) | (24) |

FIG. 26

| Methods for Destination ID | | A | B | C | D | E | F | G | H | I | J | K | L |
|---|---|---|---|---|---|---|---|---|---|---|---|---|---|
| PSCCH | SCI | D1 | D1 | D1 | D1 | | | | D1 | D1 | D1 | | |
| PSCCH | CRC scrambling | D2 | | | | D1 | D1 | D1 | D2 | D2 | D2 | D | |
| PSCCH | Scrambling sequence initialization | | D2/D | | | D2/D | | | D3/D | | | | D |
| PSSCH | TB(higher layer) | | | D2 | | | D2 | | | D3 | | | (D) |
| PSSCH | CRC scrambling | (D) | (D) | (D1) | D2/D | (D) | (D1) | D2/D | (D) | (D1+D2) | D3/D | (D) | (D) |
| PSSCH | Scrambling sequence initialization | (D) | (D) | (D1) | (D1)/(D) | (D) | (D1) | (D1)/(D) | (D) | (D1+D2) | (D1+D2)/(D) | (D) | (D) |

FIG. 27

| | Methods for Destination ID | A | B | C | D | E | F | G | H | I | J | K | L |
|---|---|---|---|---|---|---|---|---|---|---|---|---|---|
| PSCCH | SCI | 8 | 8 | 8 | 8 | | | | 8 | 8 | 8 | | |
| | CRC scrambling | 16 | | | | 16 | 16 | 16 | 8 | 8 | 8 | 24 | |
| | Scrambling sequence initialization | | 16/24 | | | 8/24 | | | 8/24 | | | | 24 |
| PSSCH | TB(higher layer) | | | 16 | | | 8 | | | 8 | | | (24) |
| | CRC scrambling | (24) | (24) | (8) | 16/24 | (24) | (16) | 8/24 | (24) | (16) | 8/24 | (24) | (24) |
| | Scrambling sequence initialization | (24) | (24) | (8) | (8/24) | (24) | (16) | (16/24) | (24) | (16) | (16/24) | (24) | (24) |

FIG. 28

| Methods for Source ID and Destination ID | | e+A | | a+B | | a+I | | a+L | | d+J | | e+G | |
|---|---|---|---|---|---|---|---|---|---|---|---|---|---|
| | | S_ID | D_ID | S_ID | D_ID | S_ID | D_ID | S_ID | D_ID | S_ID | D_ID | S_ID | D_ID |
| PSCCH | SCI | 8 | 8 | | 8 | | 8 | | | | 8 | 8 | |
| | CRC scrambling | | 16 | 16 | | 8 | 8 | 16 | | 8 | 8 | | 16 |
| | Scrambling sequence initialization | | | | 16/24 | | | | 24 | | | | |
| PSSCH | TB(higher layer) | | | 8 | | 16 | 8 | 8 | (24) | | | | |
| | CRC scrambling | 16/24 | (24) | | (24) | | (16) | | (24) | 16/24 | 8/24 | 16/24 | 8/24 |
| | Scrambling sequence initialization | (8/24) | (24) | (16) | (24) | (8) | (16) | (16) | (24) | (8/24) | (16/24) | (8/24) | (16/24) |

FIG. 29

METHOD AND APPARATUS OF SOURCE INDICATION FOR SIDELINK TRANSMISSION IN A WIRELESS COMMUNICATION SYSTEM

CROSS-REFERENCE TO RELATED APPLICATIONS

The present application claims priority to and is a continuation of U.S. application Ser. No. 16/563,475, filed on Sep. 6, 2019, entitled "METHOD AND APPARATUS OF SOURCE INDICATION FOR SIDELINK TRANSMISSION IN A WIRELESS COMMUNICATION SYSTEM", the entire disclosure of which is incorporated herein in its entirety by reference. U.S. application Ser. No. 16/563,475 claims the benefit of U.S. Provisional Patent Application Ser. No. 62/729,273 filed on Sep. 10, 2018, the entire disclosure of which is incorporated herein in its entirety by reference.

FIELD

This disclosure generally relates to wireless communication networks, and more particularly, to a method and apparatus of source indication for sidelink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a transmitting device. In one embodiment, the method includes being configured or allocated with an identity, wherein the identity comprises a first part of the identity and a second part of the identity. The method also includes the transmitting device generating a data packet for sidelink transmission, wherein the data packet includes the second part of the identity. Furthermore, the method includes transmitting device generating a control information associated with the data packet, wherein the control information includes the first part of the identity. The method further includes the transmitting device transmits the control information and the data packet.

BRIEF DESCRIPTION OF THE DRAWINGS

FIG. 12 is a reproduction of Table 14.2-1 of 3GPP TS 36.213 V15.2.0.

FIG. 13 is a reproduction of Table 14.2-2 of 3GPP TS 36.213 V15.2.0.

FIG. 14 is a reproduction of Table 14.2.1-1 of 3GPP TS 36.213 V15.2.0.

FIG. 15 is a reproduction of Table 14.2.1-2 of 3GPP TS 36.213 V15.2.0.

FIG. 20 is a reproduction of Table 5.4-1 of 3GPP TS 36.211 V15.2.0.

FIG. 22 is a reproduction of Table 6.8.1-1 of 3GPP TS 36.211 V15.2.0.

FIG. 24 is a table according to one exemplary embodiment.

FIG. 25 is a table according to one exemplary embodiment.

FIG. 26 is a table according to one exemplary embodiment.

FIG. 27 is a table according to one exemplary embodiment.

FIG. 28 is a table according to one exemplary embodiment.

FIG. 29 is a table according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia, Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; R3-160947, TR 38.801 V0.1.0, "Study on New Radio Access Technology; Radio Access Architecture and Interfaces"; R2-164306, "Summary of email discussion [93bis #23][NR] Deployment scenarios", NTT DOCOMO; 3GPP RAN2 #94 meeting minute; TS 36.213 V15.2.0 (2018-06), "E-UTRA; Physical layer procedures (Release 15)"; TS 36.212 V15.2.1 (2018-07), "E-UTRA); Physical layer; Multiplexing and channel coding (Release 15)"; TS 36.211 V15.2.0 (2018-06), "E-UTRA); Physical layer; Physical channels and modulation (Release 15)"; and Draft Report of 3GPP TSG RAN WG1 #94 v0.1.0 (Gothenburg, Sweden, 20-24 Aug. 2018). The standards and documents listed above are hereby expressly incorporated by reference in their entirety.

Figure 1:
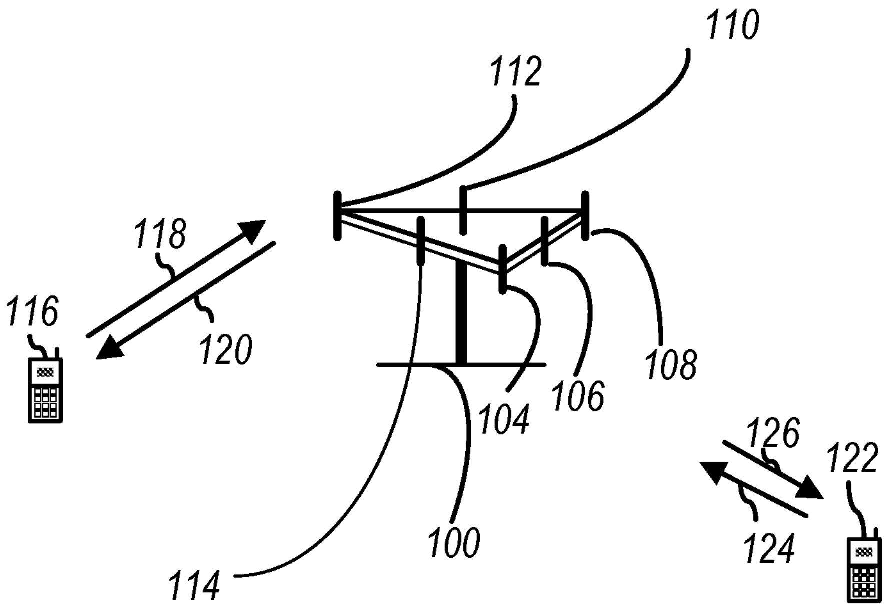
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
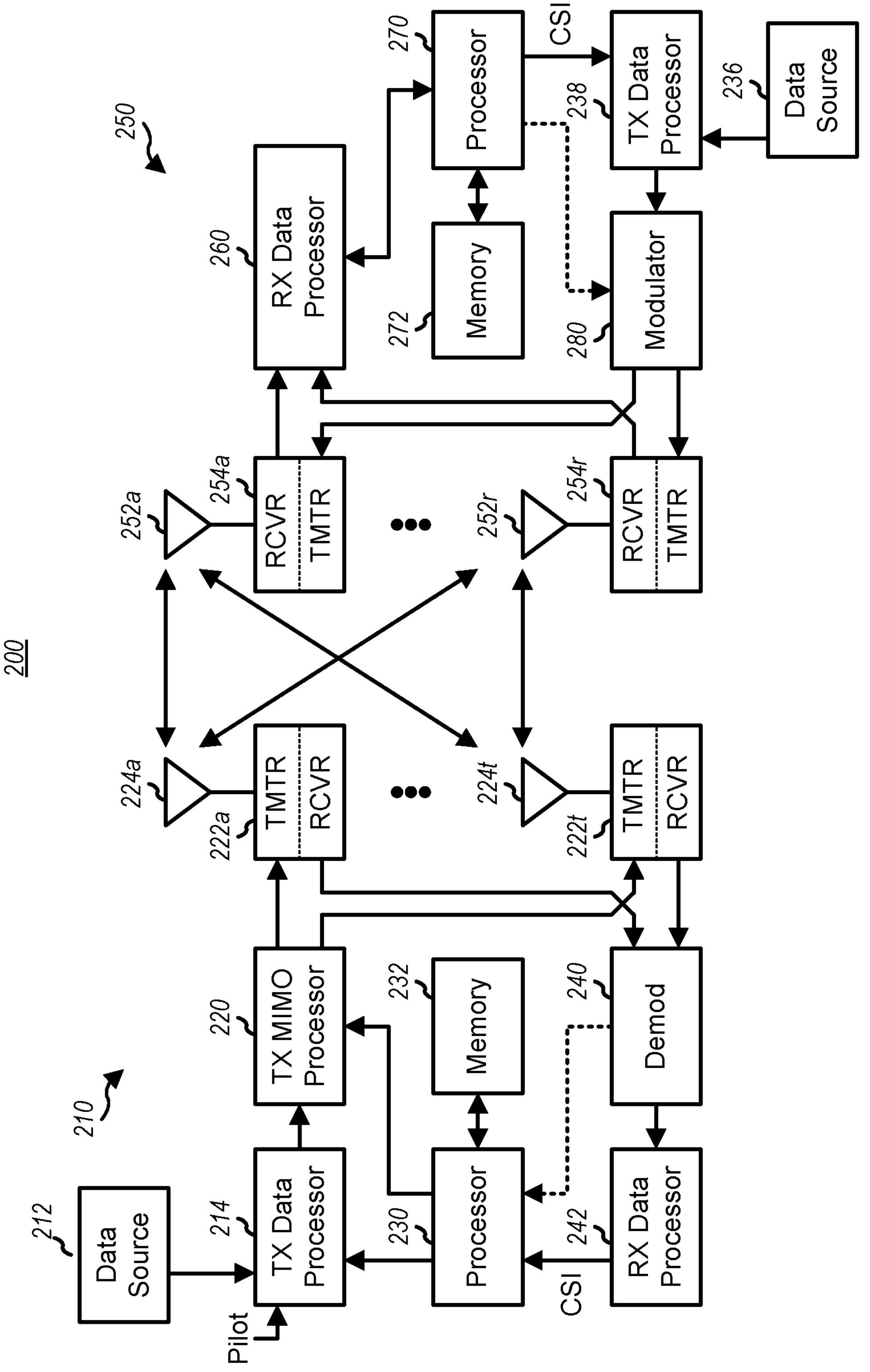
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$"detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
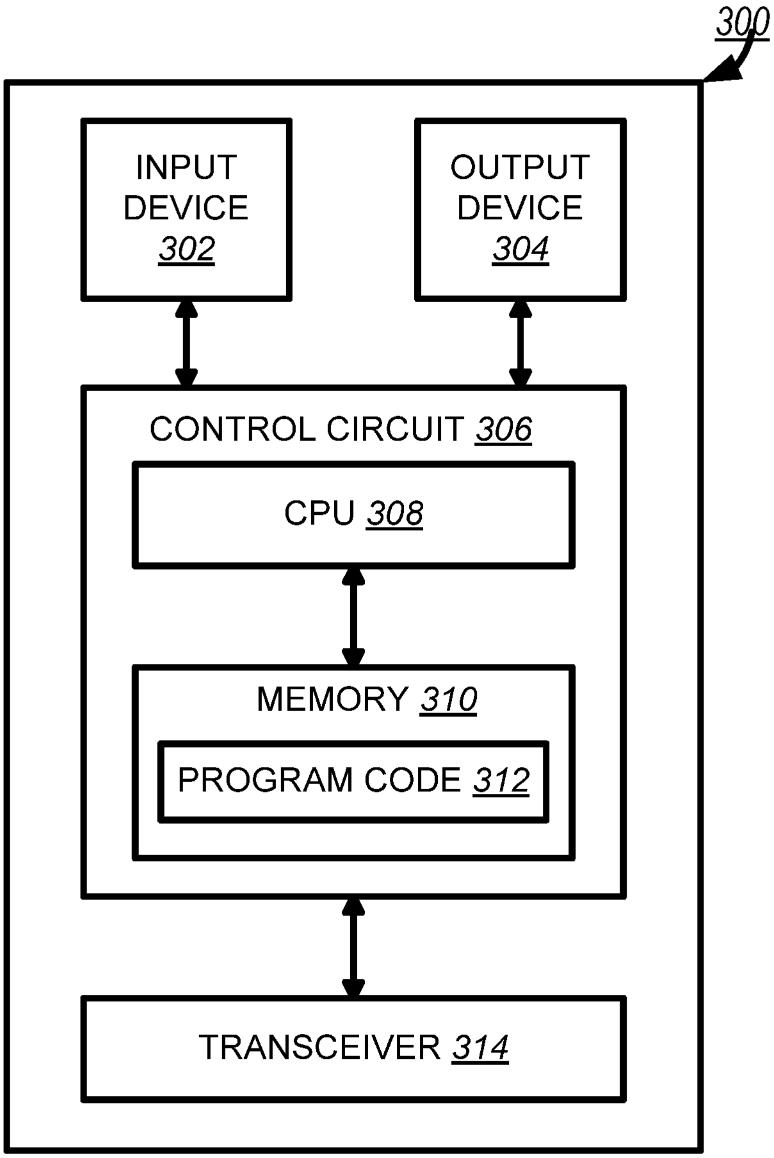
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
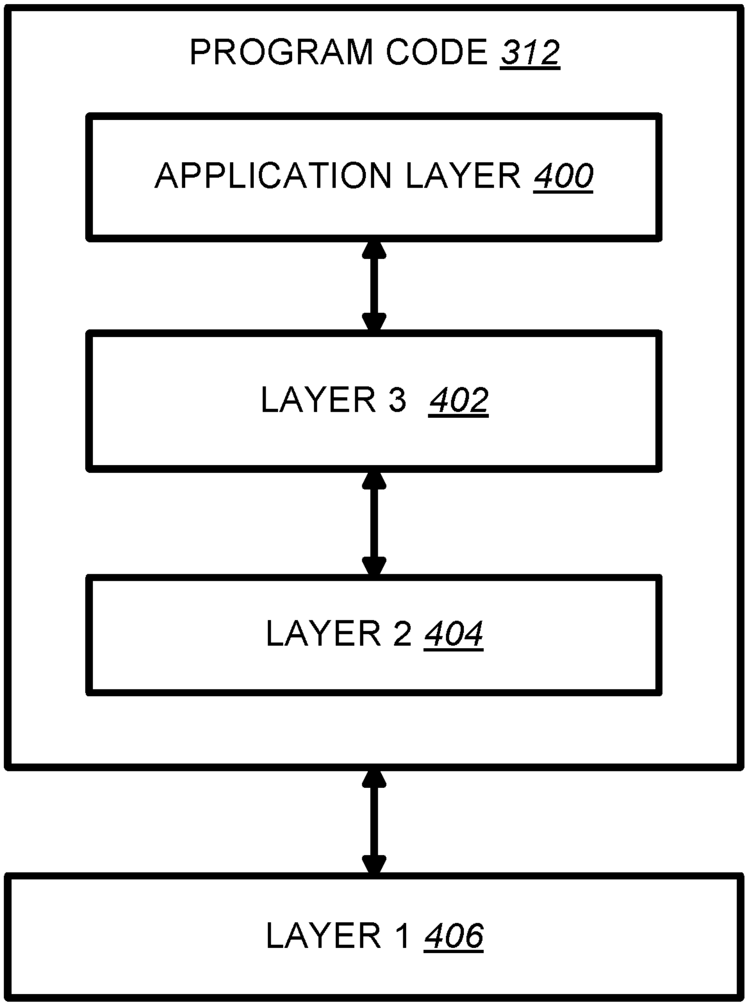
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:

eMBB (enhanced Mobile Broadband)

mMTC (massive Machine Type Communications)

URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Figure 5:
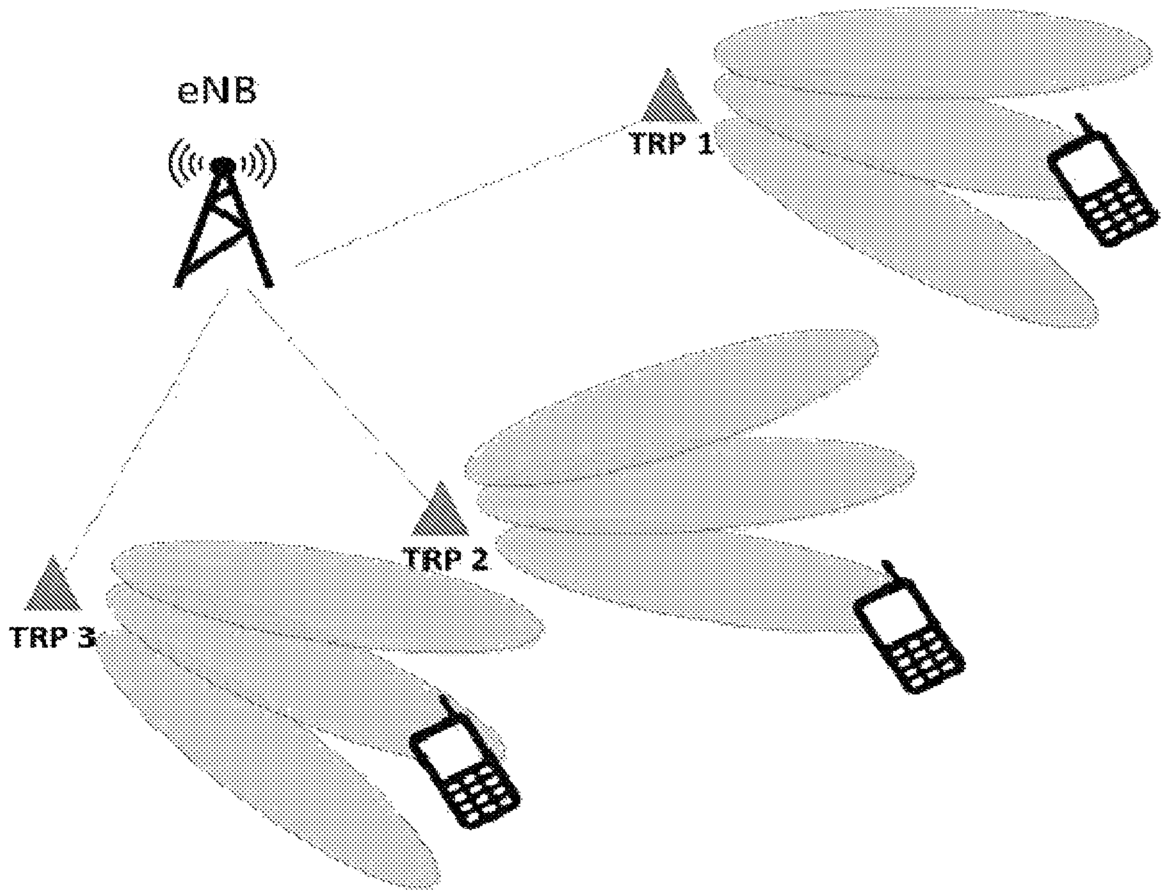
FIG. 5 is a reproduction of FIG. 1 of 3GPP R2-162709.

Based on 3GPP R2-162709 and as shown in FIG. 5, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR can be listed as follows:

Intra-TRP mobility

Inter-TRP mobility

Inter-NR eNB mobility

Figure 6:
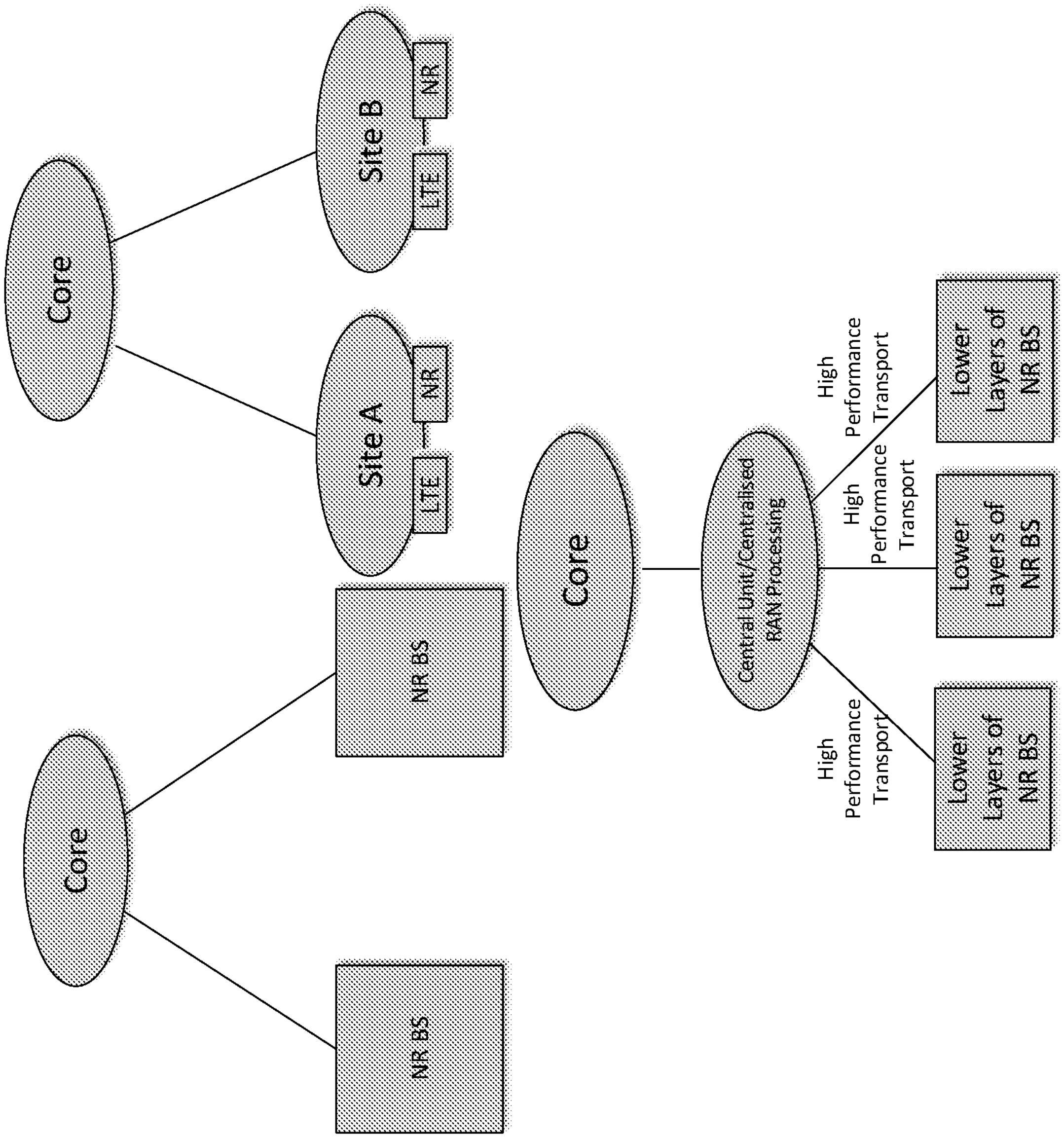
FIGS. 6 and 7 are reproduction of figures of 3GPP R3-160947.
Figure 7:
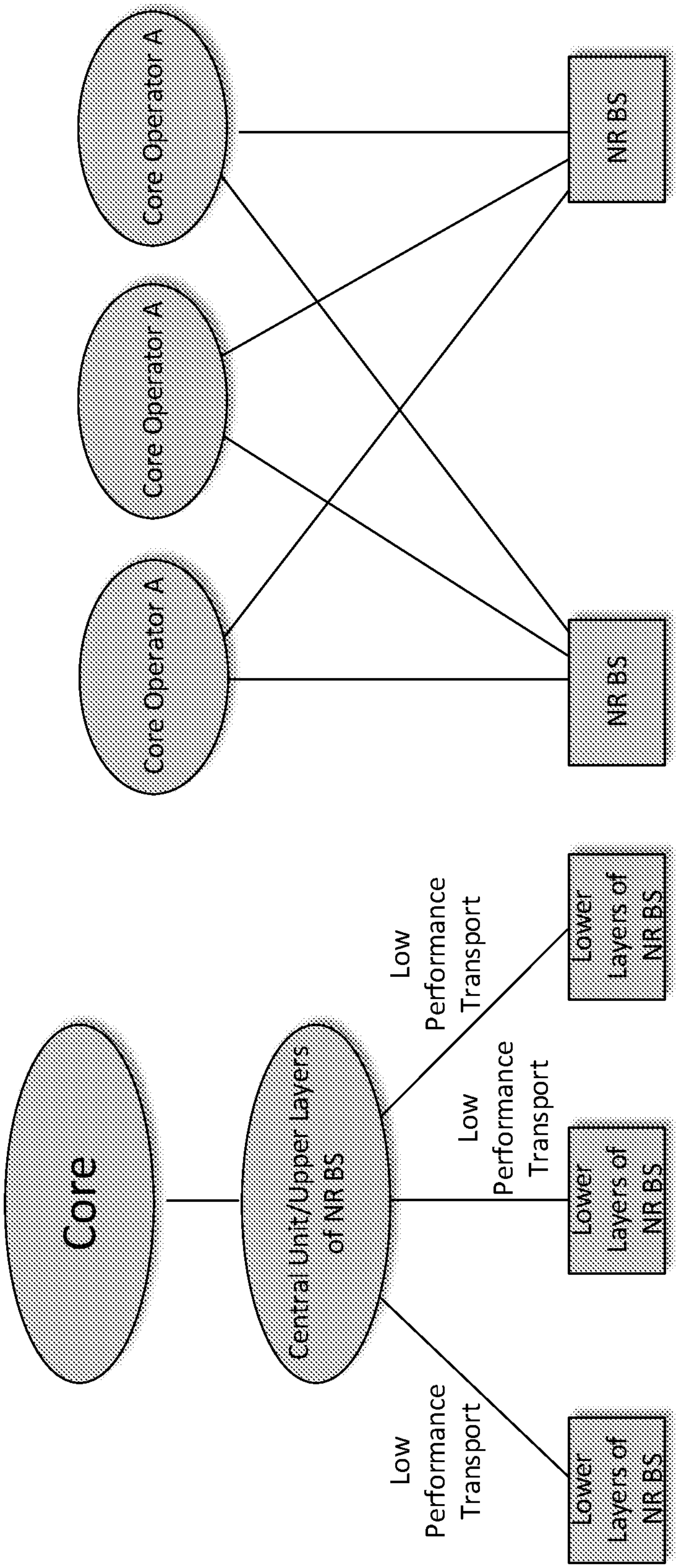

Based on 3GPP R3-160947, the scenarios illustrated in FIGS. 6 and 7 should be considered for support by the NR radio network architecture.

Based on 3GPP R2-164306, the following scenarios in terms of cell layout for standalone NR are captured to be studied:

Macro cell only deployment

Heterogeneous deployment

Small cell only deployment

Based on 3GPP RAN2 #94 meeting minutes, 1 NR eNB corresponds to 1 or many TRPs. Two levels of network controlled mobility:

RRC driven at "cell" level.

Zero/Minimum RRC involvement (e.g. at MAC/PHY)

Figure 8:
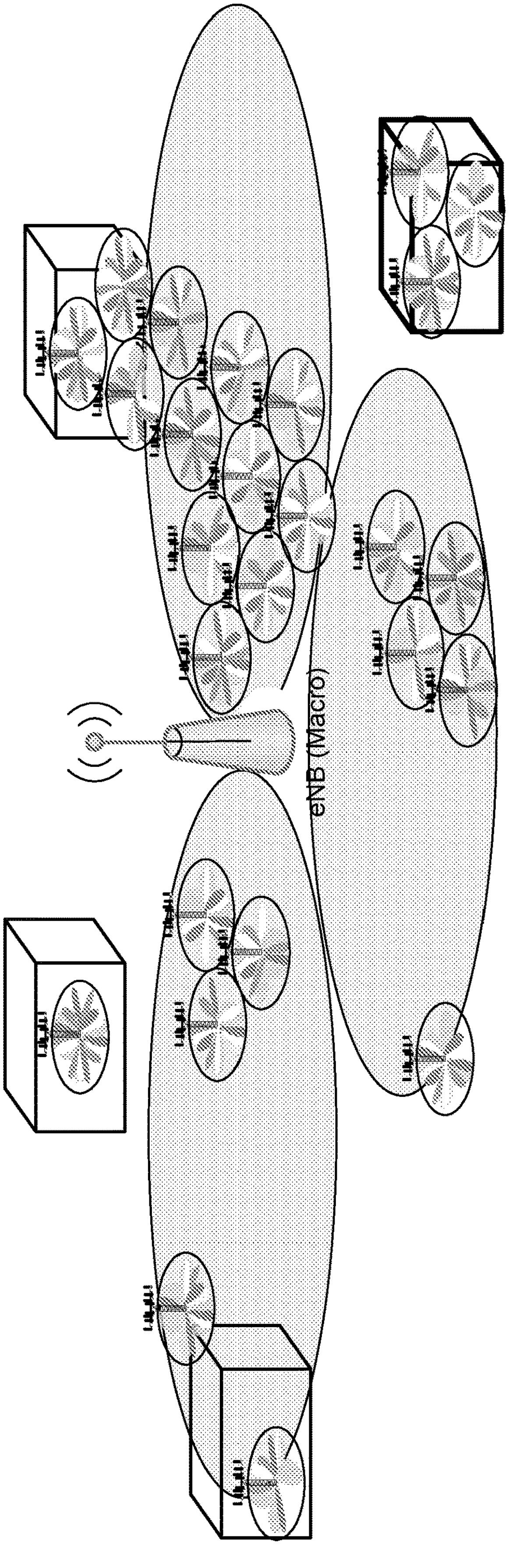
FIG. 8 shows an exemplary deployment with single TRP cell.
Figure 9:
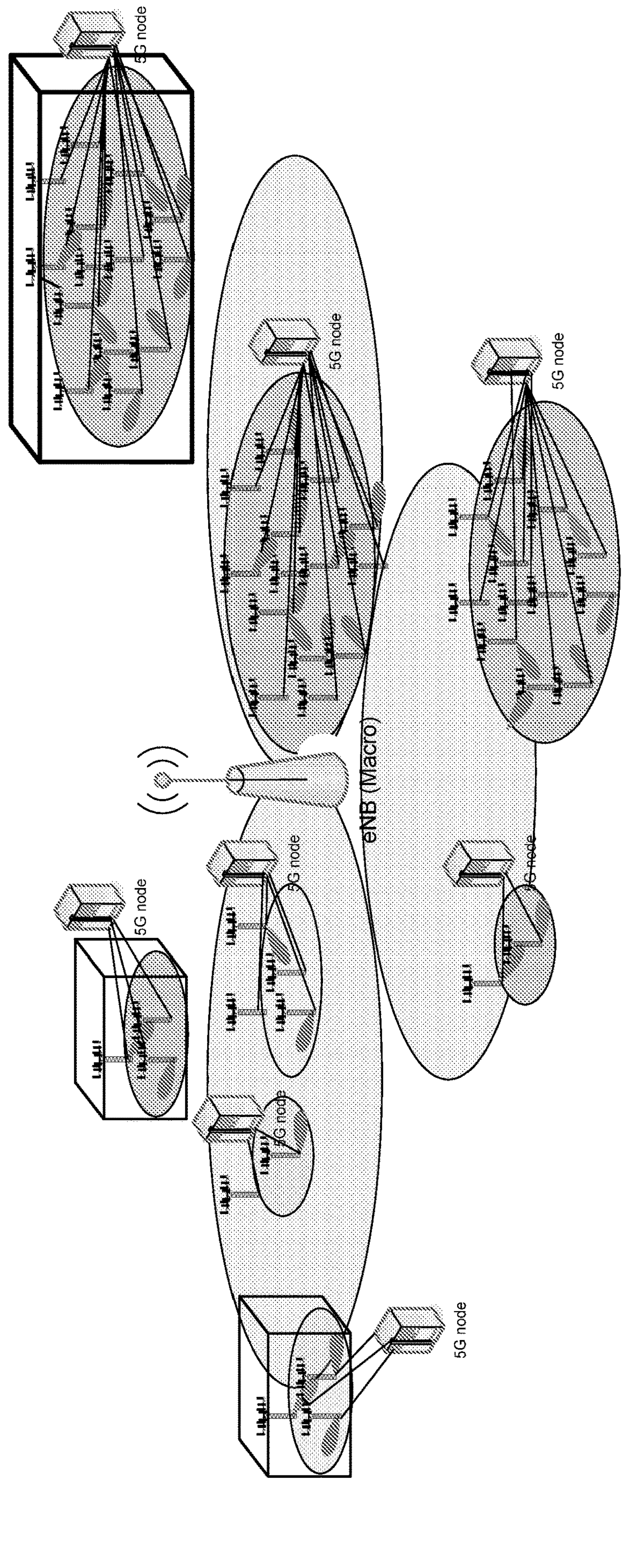
FIG. 9 shows an exemplary deployment with multiple TRP cells.
Figure 10:
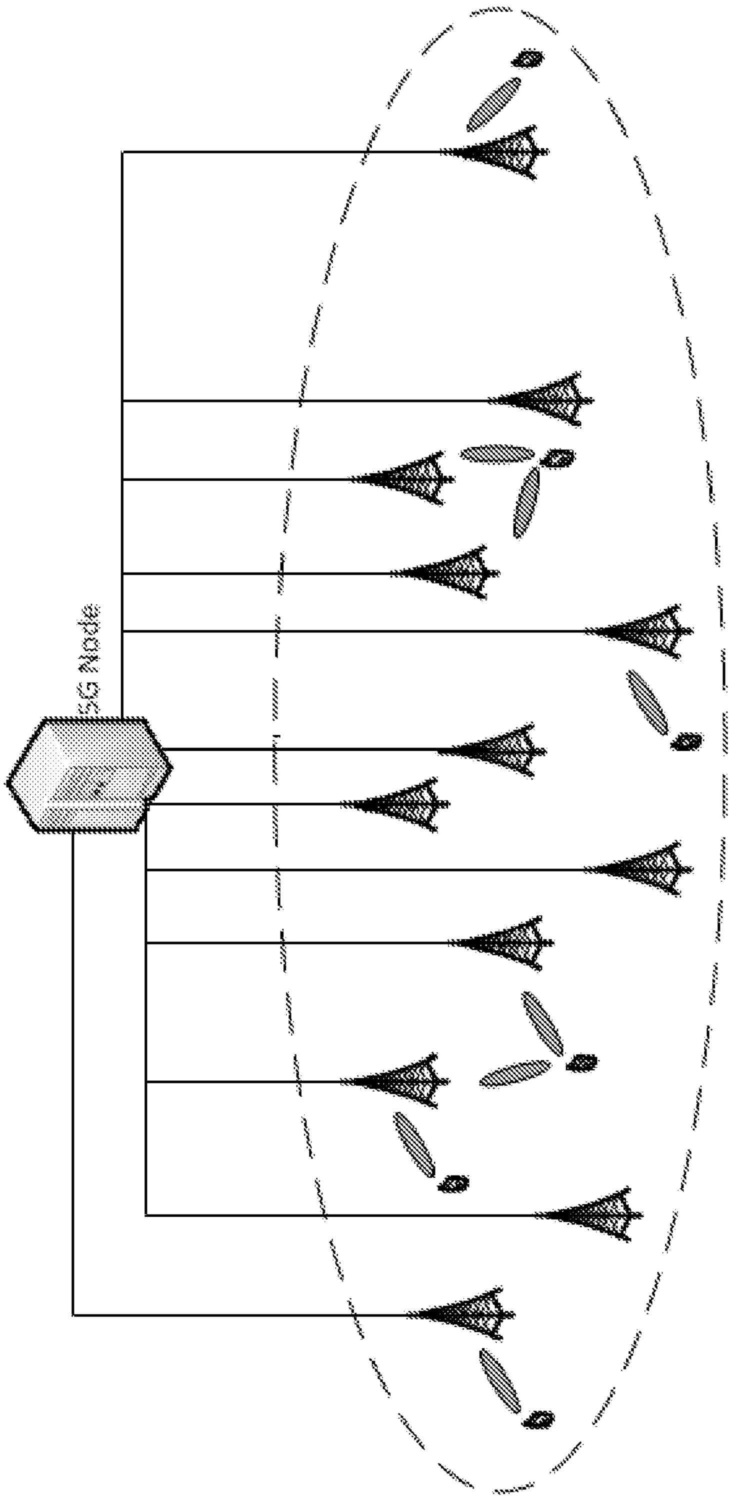
FIG. 10 shows an exemplary 5G cell comprising a 5G node with multiple TRPs.
Figure 11:
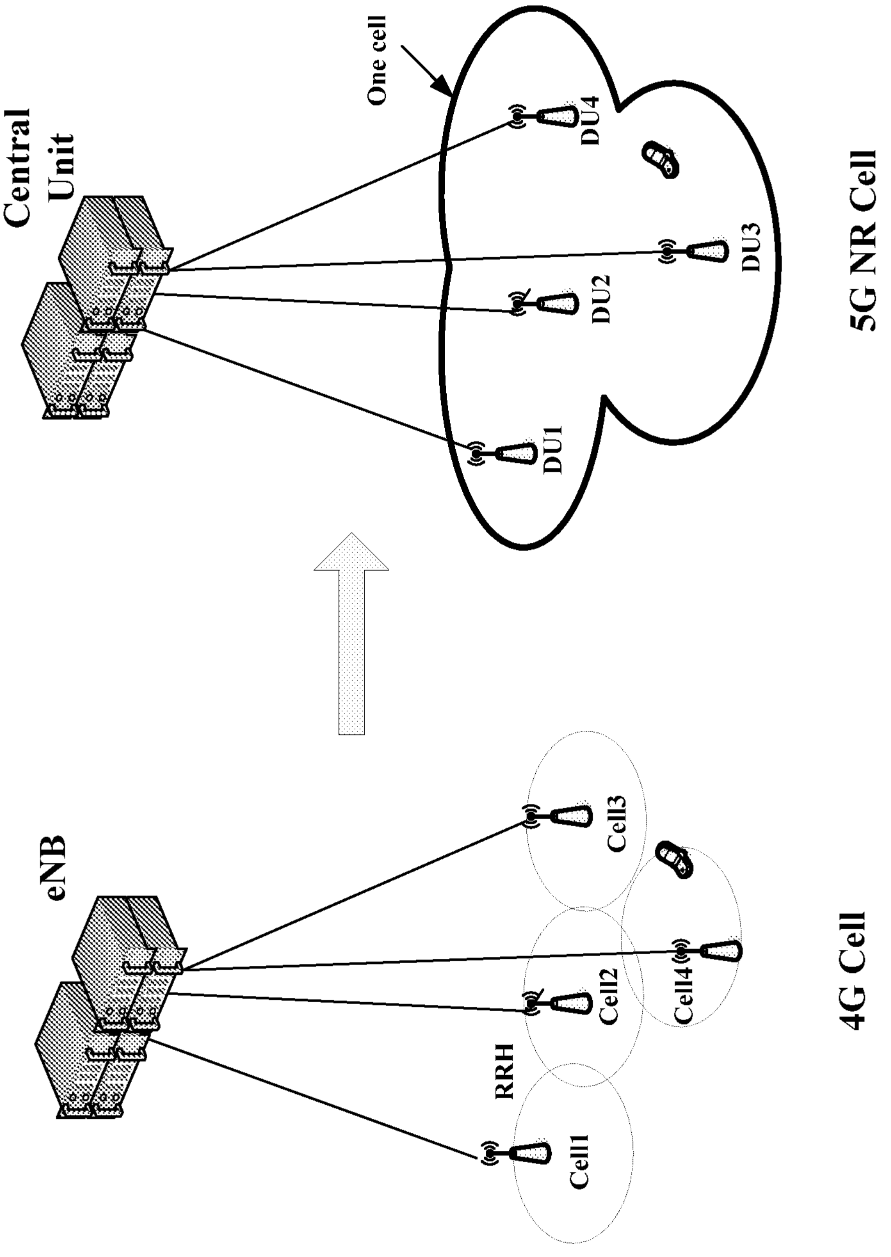
FIG. 11 an exemplary comparison between a LTE cell and a NR cell.

FIGS. 8 to 11 show some examples of the concept of a cell in 5G NR. FIG. 8 is a reproduction of a portion of FIG. 1 of 3GPP R2-163879, and shows exemplary different deployment scenarios with single TRP cell. FIG. 9 is a reproduction of a portion of FIG. 1 of 3GPP R2-163879, and shows exemplary different deployment scenarios with multiple TRP cells. FIG. 10 is a reproduction of FIG. 3 of 3GPP R2-162210, and shows an exemplary 5G cell comprising a 5G node with multiple TRPs. FIG. 11 is a reproduction of FIG. 1 of 3GPP R2-163471, and shows an exemplary comparison between a LTE cell and a NR cell.

3GPP TS 36.213 specifies the UE procedure for V2X (Vehicle-to-Everything) transmission as shown below. In general, the V2X transmissions are performed as sidelink transmission mode 3 or sidelink transmission mode 4.

14 UE Procedures Related to Sidelink

A UE can be configured by higher layers with one or more PSSCH resource configuration(s). A PSSCH resource configuration can be for reception of PSSCH, or for transmission of PSSCH. The physical sidelink shared channel related procedures are described in Subclause 14.1.

A UE can be configured by higher layers with one or more PSCCH resource configuration(s). A PSCCH resource configuration can be for reception of PSCCH, or for transmission of PSCCH and the PSCCH resource configuration is associated with either sidelink transmission mode 1, 2, 3 or sidelink transmission mode 4. The physical sidelink control channel related procedures are described in Subclause 14.2.

[ . . . ]

14.1 Physical Sidelink Shared Channel Related Procedures 14.1.1 UE Procedure for Transmitting the PSSCH If the UE transmits SCI format 1 on PSCCH according to a PSCCH resource configuration in subframe n, then for the corresponding PSSCH transmissions of one TB for sidelink transmission mode 3, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

for sidelink transmission mode 4, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

if higher layer indicates that rate matching for the last symbol in the subframe is used for the given PSSCH Transmission Format of corresponding SCI format 1 is set to 1, the modulation order is determined using the "modulation and coding scheme" field ($I_{MCS}$) in SCI format 1.

for $0 \le I_{MCS} \le 28$, the TBS index ($I_{TBS}$) is determined based on $I_{MCS}$ and Table 8.6.1-1, for $29 \le I_{MCS} \le 31$, the TBS index ($I_{TBS}$) is determined based on $I_{MCS}$ and Table 14.1.1-2, the transport block size is determined by using $I_{TBS}$ and setting the Table 7.1.7.2.1-1 column indicator to $\max\{\lfloor N'_{PRB} \times 0.8 \rfloor, 1\}$, where $N'_{PRB}$ to the total number of allocated PRBs based on the procedure defined in Subclause 14.1.1.4A and 14.1.1.4B.

otherwise

Transmission Format of SCI format 1 is set to 0 if present, the modulation order is determined using the "modulation and coding scheme" field ($I_{MCS}$) in SCI format 1. For $0 \le I_{MCS} \le 28$, the modulation order is set to $Q' = \min(4, Q'_m)$, where $Q'_m$ is determined from Table 8.6.1-1.

the TBS index ($I_{TBS}$) is determined based on $I_{MCS}$ and Table 8.6.1-1, and the transport block size is determined using $I_T$BS and the number of allocated resource blocks ($N_{PRB}$) using the procedure in Subclause 7.1.7.2.1.

[ . . . ]

14.2 Physical Sidelink Control Channel Related Procedures

For sidelink transmission mode 1, if a UE is configured by higher layers to receive DCI format 5 with the CRC scrambled by the SL-RNTI, the UE shall decode the PDCCH/EPDCCH according to the combination defined in Table 14.2-1.

[Table 14.2-1 of 3GPP TS 36.213 V15.2.0, entitled "PDCCH/EPDCCH configured by SL-RNTI", is reproduced as FIG. 12]

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

[Table 14.2-2 of 3GPP TS 36.213 V15.2.0, entitled "PDCCH/EPDCCH configured by SL-V-RNTI or SL-SPS-V-RNTI", is reproduced as FIG. 13]

The carrier indicator field value in DCI format 5A corresponds to v2x-InterFreqInfo.

[ . . . ]

14.2.1 UE Procedure for Transmitting the PSCCH

For sidelink transmission mode 3,

The UE shall determine the subframes and resource blocks for transmitting SCI format 1 as follows:

SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in ($t_0^{SL}, t_1^{SL}, t_2^{SL}, \ldots$) and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), ($t_0^{SL}, t_1^{SL}, t_2^{SL}, \ldots$) is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init}$·$L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in ($t_0^{SL}, t_1^{SL}, t_2^{SL}, \ldots$) and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), ($t_0^{SL}, t_1^{SL}, t_2^{SL}, \ldots$) is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, is the value indicated by "Time gap between initial transmission and retransmission" field in the configured sidelink grant, subframe $t_q^{SL}$ corresponds to the subframe $n+k_{init}$·$L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among {0, 3, 6, 9} in each PSCCH transmission.

For sidelink transmission mode 4,

The UE shall determine the subframes and resource blocks for transmitting SCI format 1 as follows:

SCI format 1 is transmitted in two physical resource blocks per slot in each subframe where the corresponding PSSCH is transmitted.

If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.

If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$, where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

the UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation field according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among {0, 3, 6, 9} in each PSCCH transmission.

[Table 14.2.1-1 of 3GPP TS 36.213 V15.2.0, entitled "Mapping of DCI format 5A offset field to indicated value m", is reproduced as FIG. 14]

[Table 14.2.1-2 of 3GPP TS 36.213 V15.2.0, entitled "Determination of the Resource reservation field in SCI format 1", is reproduced as FIG. 15]

3GPP TS 36.212 specifies CRC attachment for downlink shared channel and downlink control information as shown below. In general, the downlink shared channel and downlink control information are for communication between network node and UE, i.e. Uu link.

5.3.2 Downlink Shared Channel, Paging Channel and Multicast Channel

FIG. 5.3.2-1 shows the processing structure for each transport block for the DL-SCH, PCH and MCH transport channels. Data arrives to the coding unit in the form of a maximum of two transport blocks every transmission time interval (TTI) per DL cell. The following coding steps can be identified for each transport block of a DL cell:

Add CRC to the transport block

Code block segmentation and code block CRC attachment

Channel coding

Rate matching

Code block concatenation

The coding steps for PCH and MCH transport channels, and for one transport block of DL-SCH are shown in the figure below. The same processing applies for each transport block on each DL cell.

Figure 16:
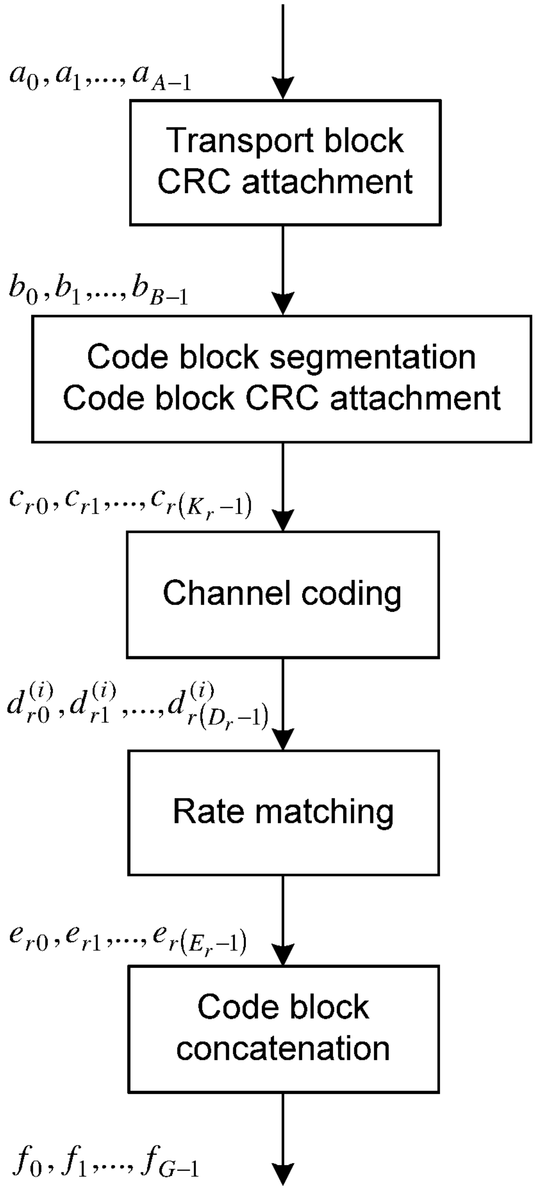
FIG. 16 is a reproduction of FIG. 5.3.2-1 of 3GPP TS 36.212 V15.2.1.

[FIG. 5.3.2-1 of 3GPP TS 36.212 V15.2.1, entitled "Transport block processing for DL-SCH, PCH and MCH", is reproduced as FIG. 16]

5.3.2.1 Transport Block CRC Attachment

Error detection is provided on transport blocks through a Cyclic Redundancy Check (CRC).

The entire transport block is used to calculate the CRC parity bits. Denote the bits in a transport block delivered to layer 1 by $a_0, a_1, a_2, a_3, \ldots, a_{A-1}$, and the parity bits by $p_0, p_1, p_2, p_3, \ldots, p_{L-1}$. A is the size of the transport block and L is the number of parity bits. The lowest order information bit $a_0$ is mapped to the most significant bit of the transport block as defined in subclause 6.1.1 of [5].

The parity bits are computed and attached to the transport block according to subclause 5.1.1 setting L to 24 bits and using the generator polynomial $g_{CRC24A}(D)$.

5.3.2.2 Code Block Segmentation and Code Block CRC Attachment

The bits input to the code block segmentation are denoted by $b_0, b_1, b_2, b_3, \ldots, b_{B-1}$ where B is the number of bits in the transport block (including CRC).

Code block segmentation and code block CRC attachment are performed according to subclause 5.1.2.

The bits after code block segmentation are denoted by $c_{r0}, c_{r1}, c_{r2}, c_{r3}, \ldots, c_{r(K_r-1)}$, where r is the code block number and $K_r$ is the number of bits for code block number r.

[ . . . ]

5.3.3 Downlink Control Information

A DCI transports downlink, uplink or sidelink scheduling information, requests for aperiodic CQI reports, LAA common information, notifications of MCCH change [6] or uplink power control commands for one cell and one RNTI. The RNTI is implicitly encoded in the CRC.

FIG. 5.3.3-1 shows the processing structure for one DCI. The following coding steps can be identified:

Information element multiplexing

CRC attachment

Channel coding

Rate matching

The coding steps for DCI are shown in the figure below.

Figures 17, 18:
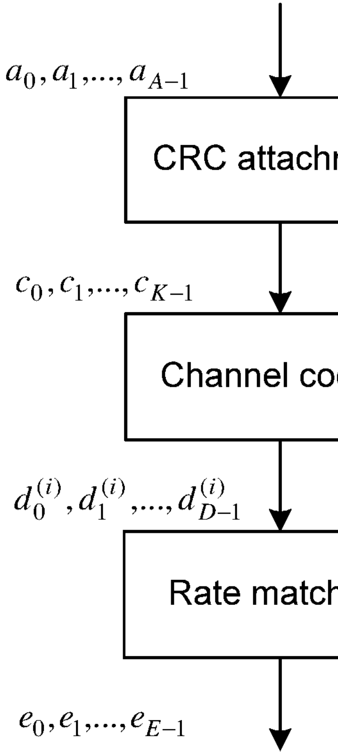
FIG. 17 is a reproduction of FIG. 5.3.3-1 of 3GPP TS 36.212 V15.2.1.
FIG. 18 is a reproduction of Table 5.3.3.2-1 of 3GPP TS 36.212 V15.2.1.

[FIG. 5.3.3-1 of 3GPP TS 36.212 V15.2.1, entitled "Processing for one DCI", is reproduced as FIG. 17]

[ . . . ]

5.3.3.1.9 Format 5

DCI format 5 is used for the scheduling of PSCCH, and also contains several SCI format 0 fields used for the scheduling of PSSCH.

The following information is transmitted by means of the DCI format 5:

- Resource for PSCCH—6 bits as defined in subclause 14.2.1 of [3]
- TPC command for PSCCH and PSSCH—1 bit as defined in subclauses 14.2.1 and 14.1.1 of [3]
- SCI format 0 fields according to 5.4.3.1.1:
  - Frequency hopping flag
  - Resource block assignment and hopping resource allocation
  - Time resource pattern If the number of information bits in format 5 mapped onto a given search space is less than the payload size of format 0 for scheduling the same serving cell, zeros shall be appended to format 5 until the payload size equals that of format 0 including any padding bits appended to format 0.

5.3.3.1.9A Format 5A

DCI format 5A is used for the scheduling of PSCCH, and also contains several SCI format 1 fields used for the scheduling of PSSCH.

The following information is transmitted by means of the DCI format 5A:

- Carrier indicator –3 bits. This field is present according to the definitions in [3].
- Lowest index of the subchannel allocation to the initial transmission—$\lceil \log_2(N_{subchannel}^{SL}) \rceil$ bits as defined in subclause 14.1.1.4C of [3].
- SCI format 1 fields according to 5.4.3.1.2:
  - Frequency resource location of initial transmission and retransmission.
  - Time gap between initial transmission and retransmission.
- SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:

- SL SPS configuration index—3 bits as defined in subclause 14.2.1 of [3].
- Activation/release indication—1 bit as defined in subclause 14.2.1 of [3].

If the number of information bits in format 5A mapped onto a given search space is less than the payload size of format 0 mapped onto the same search space, zeros shall be appended to format 5A until the payload size equals that of format 0 including any padding bits appended to format 0.

If the format 5A CRC is scrambled by SL-V-RNTI and if the number of information bits in format 5A mapped onto a given search space is less than the payload size of format 5A with CRC scrambled by SL-SPS-V-RNTI mapped onto the same search space and format 0 is not defined on the same search space, zeros shall be appended to format 5A until the payload size equals that of format 5A with CRC scrambled by SL-SPS-V-RNTI.

[ . . . ]

5.3.3.2 CRC Attachment

Error detection is provided on DCI transmissions through a Cyclic Redundancy Check (CRC). The entire payload is used to calculate the CRC parity bits. Denote the bits of the payload by $a_0, a_1, a_2, a_3, \ldots, a_{A-1}$, and the parity bits by $p_0, p_1, p_2, p_3, \ldots, p_{L-1}$. A is the payload size and L is the number of parity bits.

The parity bits are computed and attached according to subclause 5.1.1 setting L to 16 bits, resulting in the sequence $b_0, b_1, b_2, b_3, \ldots, b_{B-1}$, where B=A+L.

In the case where closed-loop UE transmit antenna selection is not configured or applicable, after attachment, the CRC parity bits are scrambled with the corresponding RNTI $x_{rnti,0}, x_{rnti,1}, \ldots, x_{rnti,15}$, where $x_{rnti,0}$ corresponds to the MSB of the RNTI, to form the sequence of bits $c_0, c_1, c_2, c_3, \ldots, c_{B-1}$. The relation between $c_k$ and $b_k$ is:

$c_k = b_k$ for k=0, 1, 2, . . . , A−1

$c_k = (b_k + x_{rnti,k-A}) \bmod 2$ for k=A, A+1, A+2, . . . , A+15.

In the case where closed-loop UE transmit antenna selection is configured and applicable, after attachment, the CRC parity bits with DCI format 0 or DCI format 6-OA are scrambled with the antenna selection mask $x_{AS,0}, x_{AS,1}, \ldots, x_{AS,15}$ as indicated in Table 5.3.3.2-1 and the corresponding RNTI $x_{rnti,0}, x_{rnti,1}, \ldots, x_{rnti,15}$ to form the sequence of bits $c_0, c_1, c_3, \ldots, c_{B-1}$. The relation between $c_k$ and $b_k$ is:

$c_k = b_k$ for k=0, 1, 2, . . . , A−1

$c_k = (b_k + x_{rnti,k-A} + x_{AS,k-A}) \bmod 2$ for k=A, A+1, A+2, . . . , A+15.

[Table 5.3.3.2-1 of 3GPP TS 36.212 V15.2.1, entitled "UE transmit antenna selection mask", is reproduced as FIG. 18]

[ . . . ]

3GPP TS 36.212 also specifies CRC attachment for sidelink shared channel and sidelink control information. In general, the sidelink shared channel and sidelink control information are for communication between devices, i.e. PC5 link or device-to-device link.

5.4 Sidelink Transport Channels and Control Information

[ . . . ]

5.4.2 Sidelink Shared Channel

The processing of the sidelink shared channel follows the downlink shared channel according to subclause 5.3.2, with the following differences:

- Data arrives to the coding unit in the form of a maximum of one transport block every transmission time interval (TTI)
- In the step of code block concatenation, the sequence of coded bits corresponding to one transport block after code block concatenation is referred to as one codeword in subclause 9.3.1 of [2].

PUSCH interleaving is applied according to subclauses 5.2.2.7 and 5.2.2.8 without any control information in order to apply a time-first rather than frequency-first mapping, where $C_{mux}=2\cdot(N_{symb}^{SL}-1)$. For SL-SCH configured by higher layers for V2X sidelink, $C_{mux}=2\cdot(N_{symb}^{SL}-2)-1$ is used if the transmission format field of SCI format 1 is present and set to 1, otherwise $c_{mux}=2\cdot(N_{symb}^{SL}-2)$.

5.4.3 Sidelink Control Information

An SCI transports sidelink scheduling information.

The processing for one SCI follows the downlink control information according to subclause 5.3.3, with the following differences:

In the step of CRC attachment, no scrambling is performed.

PUSCH interleaving is applied according to subclauses 5.2.2.7 and 5.2.2.8 without any control information in order to apply a time-first rather than frequency-first mapping, where $c_{mux}=2\cdot(N_{symb}^{SL}-1)$ and the sequence of bits f is equal to e. For SCI format 1, $c_{mux}=2\cdot(N_{symb}^{SL}-2)$.

5.4.3.1 SCI Formats

The fields defined in the SCI formats below are mapped to the information bits $a_0$ to $a_{A-1}$ as follows.

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

5.4.3.1.1 SCI Format 0

SCI format 0 is used for the scheduling of PSSCH.

The following information is transmitted by means of the SCI format 0:

Frequency hopping flag—1 bit as defined in subclause 14.1.1 of [3].

Resource block assignment and hopping resource allocation—$\lceil \log_2(N_{RB}^{SL}(N_{RB}^{SL}+1)/2)\rceil$ bits For PSSCH hopping:

$N_{SL\_hop}$ MSB bits are used to obtain the value of $\tilde{n}_{PRB}(i)$ as indicated in subclause 8.4 of [3]

$(\lceil \log_2(N_{RB}^{SL}(N_{RB}^{SL}+1)/2)\rceil - N_{SL\_hop})$ bits provide the resource allocation in the subframe For non-hopping PSSCH:

$(\lceil \log_2(N_{RB}^{SL}(N_{RB}^{SL}+1)/2)\rceil)$ bits provide the resource allocation in the subframe as defined in subclause 8.1.1 of [3]

Time resource pattern—7 bits as defined in subclause 14.1.1 of [3].

Modulation and coding scheme—5 bits as defined in subclause 14.1.1 of [3]

Timing advance indication—11 bits as defined in subclause 14.2.1 of [3]

Group destination ID—8 bits as defined by higher layers 5.4.3.1.2 SCI Format 1

SCI format 1 is used for the scheduling of PSSCH.

The following information is transmitted by means of the SCI format 1:

Priority—3 bits as defined in subclause 4.4.5.1 of [7].

Resource reservation—4 bits as defined in subclause 14.2.1 of [3].

Frequency resource location of initial transmission and retransmission—$\lceil \log_2(N_{subchannel}^{SL}(N_{subchannel}^{SL}+1)/2)\rceil$ bits as defined in subclause 14.1.1.4C of [3].

Time gap between initial transmission and retransmission—4 bits as defined in subclause 14.1.1.4C of [3].

Modulation and coding scheme—5 bits as defined in subclause 14.2.1 of [3].

Retransmission index-1 bit as defined in subclause 14.2.1 of [3].

Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.

Reserved information bits are added until the size of SCI format 1 is equal to 32 bits. The reserved bits are set to zero.

3GPP TS 36.211 also specifies scrambling procedure for physical uplink shared channel, physical uplink control channel, physical downlink shared channel, and physical downlink control channel. The physical uplink shared channel, physical uplink control channel, physical downlink shared channel, and physical downlink control channel are for communication between network node and UE, i.e. Uu link.

In general, the physical uplink shared channel (PUSCH) delivers data or transport block for uplink shared channel (UL-SCH). The physical downlink shared channel (PDSCH) delivers data or transport block for downlink shared channel (DL-SCH). The physical uplink control channel (PUCCH) delivers uplink control information (UCI). The physical downlink control channel (PDCCH) delivers downlink control information (DCI).

5.3 Physical Uplink Shared Channel

Figure 19:
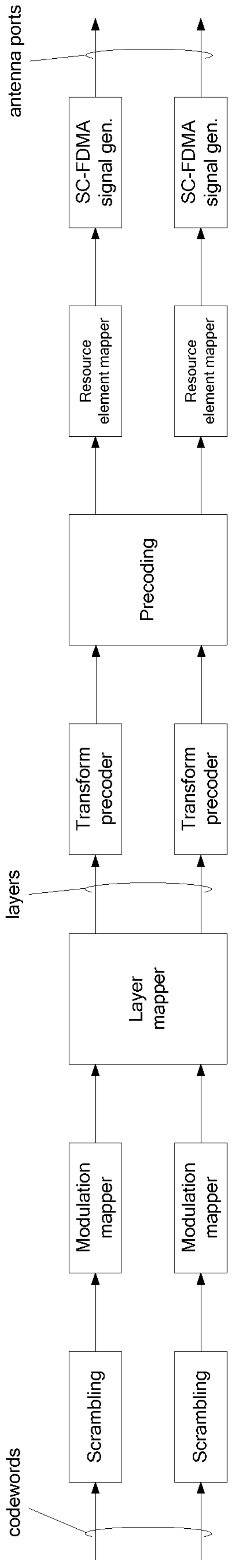
FIG. 19 is a reproduction of FIGS. 5.3-1 of 3GPP TS 36.211 V15.2.0.

The baseband signal representing the physical uplink shared channel is defined in terms of the following steps:

scrambling modulation of scrambled bits to generate complex-valued symbols mapping of the complex-valued modulation symbols onto one or several transmission layers transform precoding to generate complex-valued symbols precoding of the complex-valued symbols mapping of precoded complex-valued symbols to resource elements generation of complex-valued time-domain SC-FDMA signal for each antenna port [FIGS. 5.3-1 of 3GPP TS 36.211 V15.2.0, entitled “Overview of uplink physical channel processing”, is reproduced as FIG. 19]

5.3.1 Scrambling

For each codeword q, the block of bits $b^{(q)}(0), \ldots, b^{(q)}(M_{bit}^{(q)}-1)$, where $M_{bit}^{(q)}$ is the number of bits transmitted in codeword q on the physical uplink shared channel in one subframe/slot/subslot, shall be scrambled with a UE-specific scrambling sequence prior to modulation, resulting in a block of scrambled bits $\tilde{b}^{(q)}(0), \ldots, \tilde{b}^{(q)}(M_{bit}^{(q)}-1)$ according to the following pseudo code

```
Set i = 0
while i < M_bit^(q)
  if b^(q) (i) = x // ACK/NACK or Rank Indication placeholder bits
    b~^(q) (i) = 1
  else
    if b^(q) (i) = y       // ACK/NACK or Rank Indication repetition place-
    holder bits
      b~^(q) (i) = b~^(q) (i-1)
    else //       Data or channel quality coded bits, Rank Indication
      coded bits or ACK/NACK coded bits
```

-continued

```
    b̃(q) (i) = (b(q) (i)+c(q) (i))mod2
  end if
 end if
 i = i + 1
end while
```

where x and y are tags defined in 3GPP TS 36.212 [3] clause 5.2.2.6 and where the scrambling sequence $c^{(q)}(i)$ is given by clause 7.2. The scrambling sequence generator shall be initialised with $c_{init}=n_{RNTI}\cdot 2^{14}+q\cdot 2^{13}+\lfloor n_s/2\rfloor\cdot 2^9+N_{ID}^{cell}$ at the start of each subframe where $n_{RNTI}$ corresponds to the RNTI associated with the PUSCH transmission as described in clause 8 in 3GPP TS 36.213 [4]. For AUL PUSCH, $n_{RNTI}=0$.

[ . . . ]

5.4 Physical Uplink Control Channel

The physical uplink control channel, PUCCH, carries uplink control information. Simultaneous transmission of PUCCH and PUSCH from the same UE is supported if enabled by higher layers. For frame structure type 2, the PUCCH is not transmitted in the UpPTS field.

The physical uplink control channel supports multiple formats as shown in Table 5.4-1 with different number of bits per subframe, where $M_{RB}^{PUCCH4}$ represents the bandwidth of the PUCCH format 4 as defined by clause 5.4.2B, and $N_0^{PUCCH}$ and $N_1^{PUCCH}$ are defined in Table 5.4.2C-1.

Formats 2a and 2b are supported for normal cyclic prefix only.

[Table 5.4-1 of 3GPP TS 36.211 V15.2.0, entitled "Supported PUCCH formats", is reproduced as FIG. 20]

All PUCCH formats use a cyclic shift, $n_{cs}^{cell}(n_s,l)$, which varies with the symbol number l and the slot number $n_s$ according to $$n_{cs}^{cell}(n_s,l)=\sum_{i=0}^{7}c(8N_{symb}^{UL}\cdot n_s+8l+i)\cdot 2^i$$

where the pseudo-random sequence c(i) is defined by clause 7.2. The pseudo-random sequence generator shall be initialized with $c_{init}=n_{ID}^{RS}$, where $n_{ID}^{RS}$ is given by clause 5.5.1.5 with $N_{ID}^{cell}$ corresponding to the primary cell, at the beginning of each radio frame.

[ . . . ]

6.3 General Structure for Downlink Physical Channels

This clause describes a general structure, applicable to more than one physical channel.

The baseband signal representing a downlink physical channel is defined in terms of the following steps:

- scrambling of coded bits in each of the codewords to be transmitted on a physical channel
- modulation of scrambled bits to generate complex-valued modulation symbols
- mapping of the complex-valued modulation symbols onto one or several transmission layers
- precoding of the complex-valued modulation symbols on each layer for transmission on the antenna ports
- mapping of complex-valued modulation symbols for each antenna port to resource elements
- generation of complex-valued time-domain OFDM signal for each antenna port

Figure 21:
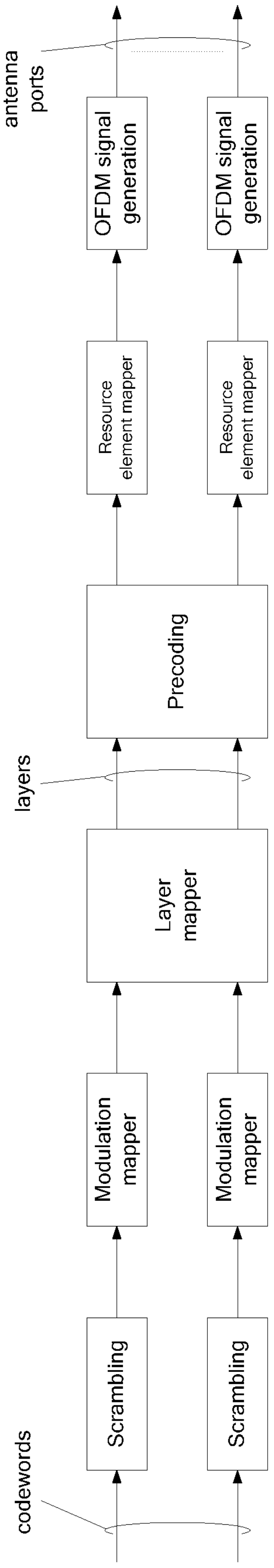
FIG. 21 is a reproduction of FIGS. 6.3-1 of 3GPP TS 36.211 V15.2.0.

[FIGS. 6.3-1 of 3GPP TS 36.211 V15.2.0, entitled "Overview of physical channel processing", is reproduced as FIG. 21]

6.3.1 Scrambling

For each codeword q, the block of bits $b^{(q)}(0), \ldots, b^{(q)}(M_{bit}^{(q)}-1)$, where $M_{bit}^{(q)}$ is the number of bits in codeword q transmitted on the physical channel in one subframe/slot/subslot, shall be scrambled prior to modulation, resulting in a block of scrambled bits $\tilde{b}^{(q)}(0), \ldots, \tilde{b}^{(q)}(M_{bit}^{(q)}-1)$ according to $$\tilde{b}^{(q)}(i)=(b^{(q)}(i)+c^{(q)}(i))\bmod 2$$

where the scrambling sequence $c^{(q)}(i)$ is given by clause 7.2. The scrambling sequence generator shall be initialised at the start of each subframe, where the initialisation value of $c_{init}$ depends on the transport channel type according to $$c_{init}=\begin{cases} n_{RNTI}\cdot 2^{14}+q\cdot 2^{13}+\lfloor n_s/2\rfloor\cdot 2^9+N_{ID}^{cell} & \text{for } PDSCH \\ \lfloor n_s/2\rfloor\cdot 2^9+N_{ID}^{MBSFN} & \text{for } PMCH \end{cases}$$

where $n_{RNTI}$ corresponds to the RNTI associated with the PDSCH transmission as described in clause 7.13GPP TS 36.213 [4].

[ . . . ]

6.8 Physical Downlink Control Channel 6.8.1 PDCCH Formats

The physical downlink control channel carries scheduling assignments and other control information. A physical control channel is transmitted on an aggregation of one or several consecutive control channel elements (CCEs), where a control channel element corresponds to 9 resource element groups. The number of resource-element groups not assigned to PCFICH or PHICH is $N_{REG}$. The CCEs available in the system are numbered from 0 to $N_{CCE}-1$, where $N_{CCE}=\lfloor N_{REG}/9\rfloor$. The PDCCH supports multiple formats as listed in Table 6.8.1-1. A PDCCH consisting of n consecutive CCEs may only start on a CCE fulfilling i mod n=0, where i is the CCE number.

Multiple PDCCHs can be transmitted in a subframe.

[Table 6.8.1-1 of 3GPP TS 36.211 V15.2.0, entitled "Supported PDCCH formats", is reproduced as FIG. 22]

6.8.2 PDCCH Multiplexing and Scrambling

The block of bits $b^{(i)}(0), \ldots, b^{(i)}(M_{bit}^{(i)}-1)$ on each of the control channels to be transmitted in a subframe, where $M_{bit}^{(i)}$ is the number of bits in one subframe to be transmitted on physical downlink control channel number i, shall be multiplexed, resulting in a block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$, where $n_{PDCCH}$ is the number of PDCCHs transmitted in the subframe.

The block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{(n_{PDCCH}-1)}-1)$ shall be scrambled with a cell-specific sequence prior to modulation, resulting in a block of scrambled bits $\tilde{b}(0), \ldots, \tilde{b}(M_{tot}-1)$ according to $$\tilde{b}(i)=(b(i)+c(i))\bmod 2$$

where the scrambling sequence c(i) is given by clause 7.2. The scrambling sequence generator shall be initialised with $c_{init}=\lfloor n_s/2\rfloor 2^9+N_{ID}^{cell}$ at the start of each subframe.

CCE number n corresponds to bits b(72n), b(72n+1), . . . , b(72n+71). If necessary, <NIL> elements shall be inserted in the block of bits prior to scrambling to ensure that the PDCCHs starts at the CCE positions as described in 3GPP TS 36.213 [4] and to ensure that the length $M_{tot}=8N_{REG}\geq\sum_{i=0}^{n_{PDCCH}-1}M_{bit}^{(i)}$ of the scrambled block of bits matches the amount of resource-element groups not assigned to PCFICH or PHICH.

6.8.3 Modulation

The block of scrambled bits $\tilde{b}(0), \ldots, \tilde{b}(M_{tot}-1)$ shall be modulated as described in clause 7.1, resulting in a block of complex-valued modulation symbols $d(0), \ldots, d(M_{symb}-1)$.

Table 6.8.3-1 specifies the modulation mappings applicable for the physical downlink control channel.

[ . . . ]

3GPP TS 36.211 also specifies scrambling procedure for physical sidelink shared channel and physical sidelink control channel. In general, the physical sidelink shared channel and physical sidelink control channel are for communication between devices, i.e. PC5 link or device-to-device link. The physical sidelink shared channel (PSSCH) delivers data/transport block for sidelink shared channel (SL-SCH). The physical sidelink control channel (PSCCH) delivers sidelink control information (SCI).

9 Sidelink 9.1 Overview

A sidelink is used for ProSe direct communication and ProSe direct discovery between UEs.

9.1.1 Physical Channels

A sidelink physical channel corresponds to a set of resource elements carrying information originating from higher layers and is the interface defined between 3GPP TS 36.212 [3] and the present document 3GPP TS 36.211. The following sidelink physical channels are defined:

Physical Sidelink Shared Channel, PSSCH

Physical Sidelink Control Channel, PSCCH

Physical Sidelink Discovery Channel, PSDCH

Physical Sidelink Broadcast Channel, PSBCH

Generation of the baseband signal representing the different physical sidelink channels is illustrated in FIG. 5.3-1.

[ . . . ]

9.3 Physical Sidelink Shared Channel 9.3.1 Scrambling

The block of bits b(0), . . . , $b(M_{bit}-1)$, where $M_{bit}$ is the number of bits transmitted on the physical sidelink shared channel in one subframe shall be scrambled according to clause 5.3.1.

The scrambling sequence generator shall be initialised with $c_{init}=n_{ID}^{X}\cdot 2^{14}+n_{ssf}^{PSSCH}\cdot 2^{9}+510$ at the start of every PSSCH subframe where for sidelink transmission modes 1 and 2, $n_{ID}^{X}=n_{ID}^{SA}$ is destination identity obtained from the sidelink control channel, and for sidelink transmission modes 3 and 4, $n_{ID}^{X}=\Sigma_{i=0}^{L-1}p_i\cdot 2^{L-1-i}$ with p and L given by clause 5.1.1 in [3] equals the decimal representation of CRC on the PSCCH transmitted in the same subframe as the PSSCH.

9.3.2 Modulation

Modulation shall be done according to clause 5.3.2. Table 9.3.2-1 specifies the modulation mappings applicable for the physical sidelink shared channel.

[ . . . ]

9.3.3 Layer Mapping

Layer mapping shall be done according to clause 5.3.2A assuming a single antenna port, υ=1.

9.3.4 Transform Precoding

Transform precoding shall be done according to clause 5.3.3 with $M_{RB}^{PUSCH}$ and $M_{sc}^{PUSCH}$ replaced by $M_{RB}^{PSSCH}$ and $M_{sc}^{PSSCH}$, respectively.

9.3.5 Precoding

Precoding shall be done according to clause 5.3.3A assuming a single antenna port, υ=1.

[ . . . ]

9.4 Physical Sidelink Control Channel 9.4.1 Scrambling

The block of bits b(0), . . . , $b(M_{bit}-1)$, where $M_{bit}$ is the number of bits transmitted on the physical sidelink control channel in one subframe shall be scrambled according to clause 5.3.1.

The scrambling sequence generator shall be initialised with $c_{init}=510$ at the start of every PSCCH subframe.

9.4.2 Modulation

Modulation shall be done according to clause 5.3.2. Table 9.4.2-1 specifies the modulation mappings applicable for the physical sidelink control channel.

[ . . . ]

9.4.3 Layer Mapping

Layer mapping shall be done according to clause 5.3.2A assuming a single antenna port, υ=1.

9.4.4 Transform Precoding

Transform precoding shall be done according to clause 5.3.3 with $M_{RB}^{PUSCH}$ and $M_{sc}^{PUSCH}$ replaced by $M_{RB}^{PSCCH}$ and $M_{sc}^{PSCCH}$, respectively.

9.4.5 Precoding

Precoding shall be done according to clause 5.3.3A assuming a single antenna port, υ=1.

[ . . . ]

In RAN1 #94 meeting [11], RAN1 assumes that the physical layer knows some information for a certain transmission belonging to a unicast or groupcast session as follows:

Agreements:

RAN1 assumes that higher layer decides if a certain data has to be transmitted in a unicast, groupcast, or broadcast manner and inform the physical layer of the decision. For a transmission for unicast or groupcast, RAN1 assumes that the UE has established the session to which the transmission belongs to. Note that RAN1 has not made agreement about the difference among transmissions in unicast, groupcast, and broadcast manner.

RAN1 assumes that the physical layer knows the following information for a certain transmission belonging to a unicast or groupcast session. Note RAN1 has not made agreement about the usage of this information.

ID

Groupcast: destination group ID, FFS: source ID

Unicast: destination ID, FFS: source ID

HARQ process ID (FFS for groupcast)

RAN1 can continue discussion on other information

Send an LS to RAN2 and SA2 for the above agreements—Hanbyul, R1-1809834, which is approved by updating action to "provide feedback if necessary". Final LS in R1-1809907

Agreements:

RAN1 to study the following topics for the SL enhancement for unicast and/or groupcast. Other topics are not precluded.

HARQfeedback

CSI acquisition

Open loop and/or closed-loop power control

Link adaptation

Multi-antenna transmission scheme

One or multiple of following terminologies may be used hereafter:

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

NR-PDCCH: A channel carries downlink control signal which is used to control communication between a UE and a network side. A network transmits NR-PDCCH on configured control resource set (CORESET) to the UE.

UL-control signal: An UL-control signal may be scheduling request (SR), channel state information (CSI), HARQ-ACK/NACK for downlink transmission Slot: a scheduling unit in NR. Slot duration is 14 OFDM symbols.

Mini-slot: A scheduling unit with duration less than 14 OFDM symbols.

Slot format information (SFI): Information of slot format of symbols in a slot. A symbol in a slot may belong to following type: downlink, uplink, unknown or other. The slot format of a slot could at least convey transmission direction of symbols in the slot.

DL common signal: Data channel carrying common information that targets for multiple UEs in a cell or all UEs in a cell. Examples of DL common signal could be system information, paging, RAR.

One or multiple of following assumptions for network side may be used hereafter:

Downlink timing of TRPs in the same cell are synchronized.

RRC layer of network side is in BS.

One or multiple of following assumptions for UE side may be used hereafter:

There are at least two UE (RRC) states: connected state (or called active state) and non-connected state (or called inactive state or idle state). Inactive state may be an additional state or belong to connected state or non-connected state.

In LTE, scrambling procedure is to utilize a scrambling sequence to scramble a coded sequence, as discussed in 3GPP TS 36.211. The scrambled sequence is then generated as a transmission signal at transmitter side. The scrambling procedure is to make the transmission signal as random-like signal, in order to eliminate interference. Moreover, the scrambling procedure can help receiver to identify the transmission signal, since the receiver needs to use corresponding scrambling sequence to descrambling the transmission signal and then decodes it. If the receiver uses incorrect scrambling sequence for descrambling the transmission signal, the descrambling sequence is not correct and is not able to be correctly decoded. Moreover, the scrambling sequence may be generated via a sequence generation given an initialization. If the initialization is different, the generated scrambling sequence is different. If the initialization is the same, the generated scrambling sequence is the same. In one embodiment, the sequence generation may be pseudo-random sequence generation.

CRC attachment is utilized for checking whether the decoded bits are correct or not. The transmitter attaches CRC bits to the information bits, and then performs channel coding and/or rate matching to get coded sequence, as discussed in 3GPP TS 36.212. Accordingly, the receiver performs CRC check using the CRC bits to check whether decoded bits are correctly or not. If the CRC check is passed, the receiver considers the decoded bits are correct and successfully receives the information bits. The information bits are the decoded bits excluding CRC bits. If the CRC check is not passed, the receiver considers the decoded bits are not correct and does not successfully receive the information bits. For some information bits, the CRC bits may be scrambled with CRC scrambling bits. The CRC scrambling is to help the receiver to identify type and/or destination of the information bits.

For instance, if there are three types of the information bits, wherein the three types of the information bits are with the same bit length, each type may have corresponding CRC scrambling bits. For identify whether the information bits are belonging to a specific type, the receiver may use the corresponding CRC scrambling bits to descrambling the CRC bits and then perform CRC check. If the CRC check is passed, the receiver considers the decoded bits are correct and knows the information bits are belonging to the specific type.

As another instance, the receiver may have some specific CRC scrambling bits for itself. For identify whether the information bits are delivered for the receiver, the receiver may use the some specific CRC scrambling bits to descrambling the CRC bits and then perform CRC check. If the CRC check is passed, the receiver considers the decoded bits are correct and knows the information bits are delivered for the receiver itself. In one embodiment, the CRC bits may be noted as CRC parity bits.

Figure 23:
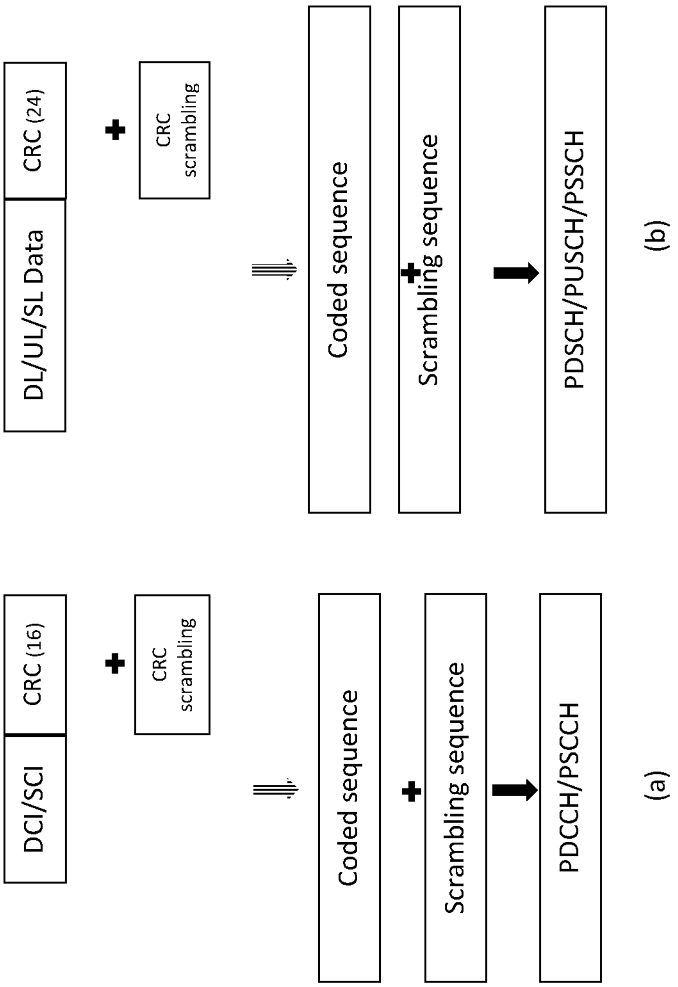
FIGS. 23(*a*) and 23(*b*) are tables according to one exemplary embodiment.

As shown in FIGS. 23(*a*) and 23(*b*), the transmitter may perform CRC attachment, CRC scrambling, scrambling, and other procedures for generating transmission signal. FIG. 24 shows CRC scrambling bits and scrambling sequence initialization for generating scrambling sequence, for each kind of information bits and corresponding transmission signals in LTE/LTE-A.

As shown in FIG. 23(*a*), the transmitter attaches CRC bits to the downlink control information (DCI). The CRC bits may be scrambled with CRC scrambling bits. In one embodiment, the CRC scrambling bits may be RNTI, $n_{RNTI}$, as shown in FIG. 24. The RNTI may correspond to a receiver, wherein the downlink control information is delivered for the receiver, such as C-RNTI and/or SPS C-RNTI of the receiver. The RNTI may correspond to one type of the downlink control information, such as C-RNTI, SPS C-RNTI, SI-RNTI, P-RNTI and/or RA-RNTI. After performing channel coding and/or rate matching, the transmitter gets a coded sequence from the downlink control information and the scrambled CRC bits. And then, the transmitter scrambles the coded sequence with a scrambling sequence.

In one embodiment, the scrambling sequence initialization may be based on physical cell identity $N_{ID}^{cell}$ as shown in FIG. 24. The receiver could be served in a cell with the physical cell identity. The transmitter may perform other procedures, such as modulation, precoding, and/or OFDM signal generation, to generate transmission signal from the scrambled sequence. When the receiver receives the transmission signal, the receiver may perform corresponding procedures to get the downlink control information, such as de-precoding, demodulation, descrambling, decoding, CRC descrambling, and/or CRC check. In one embodiment, the transmitter for delivering downlink control information (DCI) may be a network node, base station, and/or gNB. The receiver for receiving the downlink control information may also be a UE, device, vehicle, and/or V2X UE. In one embodiment, the transmission signal could be PDCCH.

As for delivering uplink control information (UCI), the transmitter may not attach CRC bits to the uplink control information (UCI). Alternatively, the transmitter may attach CRC bits to the uplink control information (UCI). The CRC bits are not scrambled with CRC scrambling bits as shown in FIG. 24. The transmitter may perform channel coding and/or scrambling to the uplink control information and/or the CRC bits. In one embodiment, the scrambling sequence initialization may be based on physical cell identity $N_{ID}^{cell}$ and/or RNTI, $n_{RNTI}$, as shown in FIG. 24. The RNTI may correspond to a transmitter, wherein the uplink control information is delivered from the transmitter, such as C-RNTI of the transmitter.

In one embodiment, the transmitter could be served in a cell with the physical cell identity. The transmitter may perform other procedures, such as modulation and OFDM/SC-OFDM signal generation, to generate transmission signal. When the receiver receives the transmission signal, the receiver may perform corresponding procedures to get the uplink control information, such as demodulation, descrambling, decoding, and/or CRC check. In one embodiment, the transmitter for delivering uplink control information (UCI) may be a UE, device, vehicle, and/or V2X UE. The receiver for receiving the uplink control information may be a network node, base station, and/or gNB. The transmission signal could be PUCCH.

As shown in FIG. 23(*a*), the transmitter attaches CRC bits to the sidelink control information (SCI). The CRC bits are not scrambled with CRC scrambling bits as shown in FIG. 24. After performing channel coding and/or rate matching, the transmitter gets a coded sequence from the sidelink control information and the CRC bits. And then, the transmitter scrambles the coded sequence with a scrambling sequence. In one embodiment, the scrambling sequence initialization may be based on a specific value, such as 510 as shown in FIG. 24. The transmitter may perform other procedures (such as modulation, precoding, and/or OFDM/SC-OFDM signal generation) to generate transmission signal from the scrambled sequence. When the receiver receives the transmission signal, the receiver may perform corresponding procedures to get the sidelink control information, such as de-precoding, demodulation, descrambling, decoding, and/or CRC check. In one embodiment, the transmitter for delivering sidelink control information (SCI) may be a UE, device, vehicle, and/or V2X UE. The receiver for receiving the sidelink control information may be a UE, device, vehicle, and/or V2X UE. The transmission signal could be PSCCH.

As shown in FIG. 23(*b*), the transmitter attaches CRC bits to a transport block from downlink shared channel (DL-SCH). The CRC bits are not scrambled with CRC scrambling bits as shown in FIG. 24. After performing channel coding and/or rate matching, the transmitter gets a coded sequence from the transport block and the CRC bits. And then, the transmitter scrambles the coded sequence with a scrambling sequence. In one embodiment, the scrambling sequence initialization may be based on physical cell identity $N_{ID}^{cell}$ and/or RNTI, $n_{RNTI}$, as shown in FIG. 24. The RNTI may correspond to a receiver, wherein the transport block is delivered for the receiver, such as C-RNTI of the receiver. The receiver could be served in a cell with the physical cell identity. The transmitter may perform other procedures (such as modulation, precoding, and/or OFDM signal generation) to generate transmission signal from the scrambled sequence. When the receiver receives the transmission signal, the receiver may perform corresponding procedures to get the transport block, such as de-precoding, demodulation, descrambling, decoding, and/or CRC check. In one embodiment, the transmitter for delivering the transport block from downlink shared channel (DL-SCH) may be a network node, base station, and/or gNB. The receiver for receiving the transport block may be a UE, device, vehicle, and/or V2X UE. The transmission signal could be PDSCH.

As shown in FIG. 23(*b*), the transmitter attaches CRC bits to a transport block from uplink shared channel (UL-SCH). The CRC bits are not scrambled with CRC scrambling bits as shown in FIG. 24. After performing channel coding and/or rate matching, the transmitter gets a coded sequence from the transport block and the CRC bits. And then, the transmitter scrambles the coded sequence with a scrambling sequence. In one embodiment, the scrambling sequence initialization may be based on physical cell identity $N_{ID}^{cell}$ and/or RNTI, $n_{RNTI}$, as shown in FIG. 24. The RNTI may correspond to the transmitter, wherein the transport block is delivered from the transmitter, such as C-RNTI of the transmitter. In one embodiment, the transmitter could be served in a cell with the physical cell identity. The transmitter may perform other procedures (such as modulation, precoding, and/or OFDM/SC-OFDM signal generation) to generate transmission signal from the scrambled sequence. When the receiver receives the transmission signal, the receiver may perform corresponding procedures to get the transport block, such as de-precoding, demodulation, descrambling, decoding, and/or CRC check. In one embodiment, the transmitter for delivering the transport block from uplink shared channel (UL-SCH) may be a UE, device, vehicle, and/or V2X UE. The receiver for receiving the transport block may be a network node, base station, and/or gNB. The transmission signal could be PUSCH.

As shown in FIG. 23(*b*), the transmitter attaches CRC bits to a transport block from sidelink shared channel (SL-SCH). The CRC bits are not scrambled with CRC scrambling bits as shown in FIG. 24. After performing channel coding and/or rate matching, the transmitter gets a coded sequence from the transport block and the CRC bits. And then, the transmitter scrambles the coded sequence with a scrambling sequence. In one embodiment, the scrambling sequence initialization may be decimal representation of CRC bits of SCI corresponding to the transport block, as shown in FIG. 24.

In one embodiment, the PSCCH delivering the SCI and the transmission signal delivering the transport block could be transmitted in the same TTI. The PSCCH delivering the SCI could schedule transmission signal delivering the transport block. Alternatively, the scrambling sequence initialization may be destination identity obtained from the corresponding sidelink control information. In one embodiment, the sidelink control information could schedule transmission signal delivering the transport block. The transmitter may perform other procedures (such as modulation, precoding, and/or OFDM/SC-OFDM signal generation) to generate transmission signal from the scrambled sequence. When the receiver receives the transmission signal, the receiver may perform corresponding procedures to get the transport block, such as de-precoding, demodulation, descrambling, decoding, and/or CRC check. In one embodiment, the transmitter for delivering the transport block from sidelink shared channel (SL-SCH) may be a UE, device, vehicle, and/or V2X UE. The receiver for receiving the transport block may be a UE, device, vehicle, and/or V2X UE. The transmission signal could be PSSCH.

In LTE/LTE-A V2X transmission, the sidelink transmission in physical layer indicates neither destination ID nor source ID. The V2X receiver needs to decode successfully the transport block and acquire destination ID and/or source ID in higher layer. It means that the V2X receiver may know some decoded transport blocks are not for itself after performing decoding and check the destination ID and/or source ID. It increases complexity and unnecessary decoding overhead for V2X receiver. Thus, one possible way is to include partial or full destination ID and/or partial or full source ID in physical layer. Currently, RAN1 assumes that the physical layer knows the ID information for a certain transmission belonging to a unicast or groupcast session (as discussed in the Draft Report of 3GPP TSG RAN WG1 #94 V0.1.0). The ID information may comprise destination group ID for groupcast V2X transmission and destination ID for unicast V2X transmission. Source ID is FFS.

For unicast V2X transmission and/or groupcast V2X transmission, HARQ-ACK is considered for sidelink enhancement, especially considering requirement of higher throughput and higher reliability. Unlike Uulink wherein the UE can know the source of DL transmission and the destination of UL transmission are network node, the V2X transmissions in sidelink may be transmitted from/to multiple possible devices. For help receiver to perform HARQ combining (new transmission and retransmissions for the same transport block), the receiver may need to know the source ID for unicast V2X transmission and/or groupcast V2X transmission, since HARQ combining is valid only for the transmissions delivering the same transport block. The receiver may know whether separate transmissions deliver the same transport block or not based on the same source ID and/or the same HARQ process ID. Thus, how to include or deliver partial or full source ID in physical layer for sidelink transmission/reception may be considered.

Method a—A transmitting device may be (pre)configured or allocated with an identity. In one embodiment, the identity may comprise or consist of a first part of the identity and a second part of the identity. The transmitting device may generate a data packet for sidelink transmission. In one embodiment, the data packet may include the second part of the identity. The transmitting device may attach CRC bits to the control information. In one embodiment, the transmitting device may perform CRC scrambling procedure for (the CRC bits of) the control information using the first part of the identity. Furthermore, the transmitting device may transmit the control transmission with the scrambled CRC bits. The transmitting device may also perform scrambling procedure for the data packet using the first part of the identity.

In one embodiment, a receiving device may receive a control information with CRC bits. Furthermore, the receiving device may perform CRC descrambling procedure for the CRC bits (of the control information) using a first part of an identity. Also, the receiving device may perform CRC check using the descrambled CRC bits (for the control information). If the CRC check for the control information passes, the receiving device may decode a data packet based on the control information. In one embodiment, the data packet could be for sidelink transmission.

In one embodiment, the receiving device may perform descrambling procedure for the data packet using the first part of the identity. Furthermore, the receiving device may acquire a second part of the identity from the data packet. In addition, the receiving device may determine the identity associated with the data packet, wherein the identity comprises or consists of the first part of the identity and the second part of the identity.

Moreover, the receiving device may be configured or allocated with a candidate set of the identities. An identity may be associated with at least a transmitting device. In one embodiment, an identity may comprise or consist of a first part of the identity and a second part of the identity. The receiving device may use the candidate set of the identities for performing CRC descrambling procedure for the CRC bits (of the control information). Furthermore, the receiving device may use (the first part of) the identity in the candidate set of the identities one by one for performing CRC descrambling procedure for the CRC bits (of the control information).

In another embodiment, a receiving device may receive a first control information with a first CRC bits. Furthermore, the receiving device may perform CRC descrambling procedure for the first CRC bits using a first part of an identity. In addition, the receiving device may receive a first data transmission based on the first control information.

In one embodiment, the receiving device may receive a second control information with a second CRC bits. Furthermore, the receiving device may perform CRC descrambling procedure for the second CRC bits using the first part of an identity. In addition, the receiving device may receive a second data transmission based on the second control information.

In one embodiment, the receiving device may combine the first data transmission and the second data transmission to decode a data packet. The data packet may be for sidelink transmission.

In one embodiment, the receiving device may perform descrambling procedure for the first data transmission using the first part of the identity. Furthermore, the receiving device may perform descrambling procedure for the second data transmission using the first part of the identity.

In one embodiment, the receiving device may acquire a second part of the identity from the data packet. Furthermore, the receiving device may determine the identity associated with the data packet, wherein the identity comprises or consists of the first part of the identity and the second part of the identity.

Moreover, the receiving device may be configured or allocated with a candidate set of the identities. An identity may be associated with at least a transmitting device. In one embodiment, an identity may comprise or consist of a first part of the identity and a second part of the identity. The receiving device may use the candidate set of the identities for performing CRC descrambling procedure for the first CRC bits and the second CRC bits. Furthermore, the receiving device may use (the first part of) the identity in the candidate set of the identities one by one for performing CRC descrambling procedure for the first CRC bits and the second CRC bits.

In one embodiment, the bit number of the first part of the identity may be limited as the bit number of the CRC bits of the control information. Furthermore, the bit number of the first part of the identity may be equal to or smaller than the bit number of the CRC bits of the control information.

Method b—A transmitting device may be (pre)configured or allocated with an identity. In one embodiment, the identity may comprise or consist of a first part of the identity and a second part of the identity. The transmitting device may generate a data packet for sidelink transmission. In one embodiment, the data packet may include the second part of the identity.

In one embodiment, the transmitting device may include the first part of the identity in the control information. Furthermore, the transmitting device may transmit the control information. In addition, the transmitting device may perform scrambling procedure for the data packet using the first part of the identity.

In one embodiment, a receiving device may receive a control information. Furthermore, the receiving device may acquire a first part of the identity from the control information. In addition, the receiving device may decode a data packet based on the control information. In one embodiment, the data packet may be for sidelink transmission.

In one embodiment, the receiving device may perform descrambling procedure for the data packet using the first part of the identity. Furthermore, the receiving device may acquire a second part of the identity from the data packet. In addition, the receiving device may determine the identity associated with the data packet, wherein the identity comprises or consists of the first part of the identity and the second part of the identity.

Moreover, the receiving device may not be configured or allocated with a candidate set of the identities. Alternatively, the receiving device may be configured or allocated with a candidate set of the identities. An identity may be associated with at least a transmitting device. In one embodiment, an identity may comprise or consist of a first part of the identity and a second part of the identity.

In another embodiment, a receiving device may receive a first control information. In one embodiment, the first control information may indicate a first part of the identity. The receiving device may receive a first data transmission based on the first control information. Furthermore, the receiving device may receive a second control information. The second control information may indicate the first part of the identity.

In one embodiment, the receiving device may receive a second data transmission based on the second control information. Furthermore, the receiving device may combine the first data transmission and the second data transmission to decode a data packet. The data packet may be for sidelink transmission.

In one embodiment, the receiving device may perform descrambling procedure for the first data transmission using the first part of the identity. Furthermore, the receiving device may perform descrambling procedure for the second data transmission using the first part of the identity. In addition, the receiving device may acquire a second part of the identity from the data packet. Also, the receiving device may determine the identity associated with the data packet, wherein the identity comprises or consists of the first part of the identity and the second part of the identity.

Moreover, the receiving device may not be configured or allocated with a candidate set of the identities. Alternatively, the receiving device may be configured or allocated with a candidate set of the identities. An identity may be associated with at least a transmitting device. Furthermore, an identity may comprise or consist of a first part of the identity and a second part of the identity.

To ensure the reliability of the control information, the bit number of control information may be limited. Thus, the bit number of the first part of the identity may not be so larger. For instance, the bit number of the first part of the identity may be equal to or smaller than 8.

Moreover, the bit number of the first part of the identity may not be so small, to avoid/eliminate the error case of source misdetection. For instance, the bit number of the first part of the identity may be equal to or larger than 4.

Method c—A transmitting device may be (pre)configured or allocated with an identity. The identity may comprise a first part of the identity and a second part of the identity.

The transmitting device may generate a data packet for sidelink transmission. In one embodiment, the transmitting device may include the first part of the identity in the control information. Furthermore, the transmitting device may attach CRC bits to the control information. In addition, the transmitting device may perform CRC scrambling procedure for (the CRC bits of) the control information using the second part of the identity. Also, the transmitting device may transmit the control information and the scrambled CRC bits.

In one embodiment, the identity may consist of the first part of the identity and the second part of the identity. Alternatively, the data packet may include a third part of the identity. The identity may comprise or consist of the first part of the identity, the second part of the identity and the third part of the identity.

Furthermore, the transmitting device may perform CRC scrambling procedure for (CRC bits of) the data packet using the first part of the identity and the second part of the identity. In one embodiment, the transmitting device may perform CRC scrambling procedure for (CRC bits of) the data packet using the (full) identity.

In one embodiment, the transmitting device may perform scrambling procedure for the data packet using the first part of the identity and/or the second part of the identity. Furthermore, the transmitting device may perform scrambling procedure for the data packet using the first part of the identity, the second part of the identity, and/or the third part of the identity. In addition, the transmitting device may perform scrambling procedure for the data packet using the (full) identity.

As shown in Methods c1 and c3 in FIG. 25, the first part of the identity may be S1 and the second part of the identity may be S2. In one embodiment, the identity S may comprise or consist of S1 and S2. S1 and S2 are exclusive parts of the identity S. In one embodiment, the bit number of S, noted as ns, is the same as summation of the bit number of S1, noted as $n_{S1}$, and the bit number of S2, noted as $n_{S2}$. S1 is $n_{S1}$ most significant bits of the identity S, and S2 is $n_{S2}$ least significant bits of the identity S. Alternatively, S1 is $n_{S1}$ least significant bits of the identity S, and S2 is $n_{S2}$ most significant bits of the identity S.

In one embodiment, the transmitting device may perform CRC scrambling procedure for (CRC bits of) the data packet using the (full) identity S, as shown in method c3 in FIG. 25. Since the receiver may know the (full) identity of transmitter upon receiving the control transmission, the (full) identity may be utilized for perform scrambling procedure or perform CRC scrambling procedure for the data packet.

As shown in Method c2 in FIG. 25, the identity may comprise or consists of the first part of the identity, the second part of the identity and a third part of the identity. In one embodiment, the data packet may include the third part of the identity. The first part of the identity may be S1, the second part of the identity may be S2, and the third part of the identity may be S3. In one embodiment, the identity S may comprise or consist of S1, S2 and S3. S1, S2, and S3 are exclusive parts of the identity S. The bit number of S, noted as ns, is the same as summation of the bit number of S1, noted as $n_{S1}$, and the bit number of S2, noted as $n_{S2}$, and the bit number of S3, noted as $n_{S3}$.

To ensure the reliability of the control information, the bit number of control information may be limited. Thus, the bit number of the first part of the identity may not be so larger. For instance, the bit number of the first part of the identity may be equal to or smaller than 8.

Moreover, the bit number of the first part of the identity may not be so small, to avoid or eliminate the error case of source misdetection. For instance, the bit number of the first part of the identity may be equal to or larger than 4.

In one embodiment, the bit number of the second part of the identity may be limited as the bit number of the CRC bits of the control information. The bit number of the second part of the identity may be equal to or smaller than the bit number of the CRC bits of the control information.

Method d—A transmitting device may be (pre)configured or allocated with an identity. In one embodiment, the identity may comprise or consist of a first part of the identity and a second part of the identity.

In one embodiment, the transmitting device may generate a data packet for sidelink transmission. Furthermore, the transmitting device may attach CRC bits to the control information. In addition, the transmitting device may perform CRC scrambling procedure for (the CRC bits of) the control information using the first part of the identity.

In one embodiment, the transmitting device may perform CRC scrambling procedure for (CRC bits of) the data packet using the second part of the identity and/or the first part of the identity. Also, the transmitting device may transmit the control information. In addition, the transmitting device may perform scrambling procedure for the data packet using the first part of the identity. Furthermore, the transmitting device may perform scrambling procedure for the data packet using the first part of the identity and/or the second part of the identity. The transmitting device may also perform scrambling procedure for the data packet using the (full) identity.

In one embodiment, the bit number of the first part of the identity may be limited as the bit number of the CRC bits of the control information. In addition, the bit number of the first part of the identity may be equal to or smaller than the bit number of the CRC bits of the control information.

Method e—A transmitting device may be (pre)configured or allocated with an identity. In one embodiment, the identity may comprise/consist of a first part of the identity and a second part of the identity.

In one embodiment, the transmitting device may generate a data packet for sidelink transmission. Furthermore, the transmitting device may include the first part of the identity in the control information. In addition, the transmitting device may perform CRC scrambling procedure for (CRC bits of) the data packet using the second part of the identity and/or the first part of the identity. Also, the transmitting device may transmit the control information.

In one embodiment, the transmitting device may perform scrambling procedure for the data packet using the first part of the identity. Furthermore, the transmitting device may perform scrambling procedure for the data packet using the first part of the identity and/or the second part of the identity. In addition, the transmitting device may perform scrambling procedure for the data packet using the (full) identity.

In one embodiment, a receiving device may receive a control information. Furthermore, the receiving device may acquire a first part of the identity from the control information. In addition, the receiving device may determine a second of the identity. Preferably, the receiving device may determine the second of the identity based on the first part of the identity. In one embodiment, the identity may comprise or consist of the first part of the identity and the second part of the identity.

In one embodiment, the receiving device may decode a data packet based on the control information. The data packet is for sidelink transmission.

In one embodiment, the receiving device may perform CRC descrambling procedure for (CRC bits of) the data packet using the second part of the identity and/or the first part of the identity. Also, the receiving device may determine the data packet is associated with the identity. Furthermore, the receiving device may perform descrambling procedure for the data packet using the first part of the identity. In addition, the receiving device may perform descrambling procedure for the data packet using the first part of the identity and/or the second part of the identity. The receiving device may also perform descrambling procedure for the data packet using the (full) identity.

Moreover, the receiving device may be configured or allocated with a candidate set of the identities. An identity may be associated with at least a transmitting device. In one embodiment, an identity may comprise or consist of a first part of the identity and a second part of the identity. According to the candidate set of the identities, the receiving device may derive the second of the identity based on the first part of the identity.

In another embodiment, a receiving device may receive a first control information. Also, the receiving device may acquire a first part of the identity from the first control information. Furthermore, the receiving device may determine a second of the identity. In addition, the receiving device may determine the second of the identity based on the first part of the identity. In one embodiment, the identity may comprise or consist of the first part of the identity and the second part of the identity.

In one embodiment, the receiving device may receive a first data transmission based on the first control information. Also, the receiving device may receive a second control information. In addition, the receiving device may acquire the same first part of the identity from the second control information. Furthermore, the receiving device may receive a second data transmission based on the second control information. The receiving device may also combine the first data transmission and the second data transmission to decode a data packet. In one embodiment, the data packet is for sidelink transmission.

In one embodiment, the receiving device may perform CRC descrambling procedure for (CRC bits of) the data packet using the second part of the identity and/or the first part of the identity. Also, the receiving device may determine the data packet is associated with the identity. Furthermore, the receiving device may perform descrambling procedure for the first data transmission using the first part of the identity. In addition, the receiving device may perform descrambling procedure for the second data transmission using the first part of the identity.

In one embodiment, the receiving device may also perform descrambling procedure for the first data transmission using the first part of the identity and/or the second part of the identity. Furthermore, the receiving device may perform descrambling procedure for the second data transmission using the first part of the identity and/or the second part of the identity. In addition, the receiving device may perform descrambling procedure for first data transmission using the (full) identity. Also, the receiving device may perform descrambling procedure for second data transmission using the (full) identity.

In one embodiment, the receiving device may be configured or allocated with a candidate set of the identities. An identity may be associated with at least a transmitting device. Furthermore, an identity may comprise or consist of a first part of the identity and a second part of the identity. According to the candidate set of the identities, the receiving device may derive the second of the identity based on the first part of the identity.

To ensure the reliability of the control information, the bit number of control information may be limited. Thus, the bit number of the first part of the identity may not be so larger.

For instance, the bit number of the first part of the identity may be equal to or smaller than 8.

Moreover, the bit number of the first part of the identity may not be so small, to avoid/eliminate the error case of source misdetection. For instance, the bit number of the first part of the identity may be equal to or larger than 4.

Method f—A transmitting device may be (pre)configured or allocated with an identity. In one embodiment, the identity may comprise or consist of a first part of the identity, a second part of the identity, and a third part of the identity.

In one embodiment, the transmitting device may generate a data packet for sidelink transmission. Furthermore, the transmitting device may include the first part of the identity in the control information.

In one embodiment, the transmitting device may attach CRC bits to the control information. Furthermore, the transmitting device may perform CRC scrambling procedure for (the CRC bits of) the control information using the second part of the identity. In addition, the transmitting device may perform CRC scrambling procedure for (CRC bits of) the data packet using the third part of the identity and/or the first part of the identity and/or the second part of the identity.

In one embodiment, the transmitting device may transmit the control information. Furthermore, the transmitting device may perform scrambling procedure for the data packet using the first part of the identity and/or the second part of the identity. In addition, the transmitting device may perform scrambling procedure for the data packet using the (full) identity.

As shown in Method f in FIG. 25, the first part of the identity may be S1, the second part of the identity may be S2, and the third part of the identity may be S3. The identity S may comprise or consist of S1, S2 and S3. S1, S2, and S3 are exclusive parts of the identity S. In one embodiment, the bit number of S, noted as ns, is the same as summation of the bit number of S1, noted as $n_{S1}$, and the bit number of S2, noted as $n_{S2}$, and the bit number of S3, noted as $n_{S3}$.

To ensure the reliability of the control information, the bit number of control information may be limited. Thus, the bit number of the first part of the identity may not be so larger. For instance, the bit number of the first part of the identity may be equal to or smaller than 8.

Moreover, the bit number of the first part of the identity may not be so small, to avoid/eliminate the error case of source misdetection. For instance, the bit number of the first part of the identity may be equal to or larger than 4.

In one embodiment, the bit number of the second part of the identity may be limited as the bit number of the CRC bits of the control information. The bit number of the second part of the identity may be equal to or smaller than the bit number of the CRC bits of the control information.

Method g—A transmitting device may be (pre)configured or allocated with an identity. The transmitting device may generate a data packet for sidelink transmission.

In one embodiment, the transmitting device may attach CRC bits to the control information. Furthermore, the transmitting device may perform CRC scrambling procedure for (the CRC bits of) the control information using the identity. In addition, the transmitting device may transmit the control transmission with the scrambled CRC bits.

In one embodiment, the transmitting device may perform CRC scrambling procedure for (CRC bits of) the data packet using the identity. Furthermore, the transmitting device may perform scrambling procedure for the data packet using the identity.

As shown in Method g in FIGS. 25 and 26, the identity S may be 24 bits. Alternatively, the identity S may be 16 bits.

In one embodiment, the bit number of the identity may be limited as the bit number of the CRC bits of the control information. Furthermore, the bit number of the identity may be equal to or smaller than the bit number of the CRC bits of the control information.

For Methods a through g discussed above, the identity may mean source identity. In particular, the identity may mean source layer-2 identity. The identity may also mean the identity of the transmitting device. The identity could be utilized to indicate which device transmits the control information and/or the data packet.

In one embodiment, the identity could be utilized for sidelink transmission. The identity could also be utilized for device-to-device transmission.

In one embodiment, the identity may not be utilized for Uu link transmission. Also, the identity may not be utilized for transmission between network and device. In one embodiment, the identity may not be C-RNTI. In particular, the identity may not be the same as C-RNTI.

In one embodiment, the identity may be configured or allocated by network. The identity may also be configured or allocated by another device. Alternatively, the identity may be preconfigured.

In one embodiment, CRC scrambling procedure for (CRC bits of) the control information or data packet using a specific identity could mean that the CRC bits of the control information or data packet is scrambled with the specific identity. Furthermore, CRC scrambling procedure for (CRC bits of) the control information or data packet using a specific identity could mean that the CRC bits of the control information or data packet and the specific identity are binary added per bit. In addition, CRC scrambling procedure for (CRC bits of) the control information or data packet using a specific identity could mean that the CRC bits of the control information or data packet and the specific identity perform XOR operation per bit.

In one embodiment, CRC scrambling procedure for (CRC bits of) the control information or data packet using a first specific identity and a second specific identity could mean that the CRC bits of the control information or data packet is scrambled with the first specific identity and the second specific identity. Furthermore, CRC scrambling procedure for (CRC bits of) the control information or data packet using a first specific identity and a second specific identity could mean that the CRC bits of the control information or data packet is scrambled with the first specific identity and the second specific identity respectively. In addition, CRC scrambling procedure for (CRC bits of) the control information or data packet using a first specific identity and a second specific identity could mean that a first part of the CRC bits of the control information or data packet and the first specific identity are binary added per bit, and a second part of the CRC bits of the control information or data packet and the second specific identity are binary added per bit.

In one embodiment, CRC scrambling procedure for (CRC bits of) the control information or data packet using a first specific identity and a second specific identity could mean that a first part of the CRC bits of the control information or data packet and the first specific identity perform XOR operation per bit, and a second part of the CRC bits of the control information or data packet and the second specific identity perform XOR operation per bit.

In one embodiment, the first part of the CRC bits of the control information or data packet and the second part of the CRC bits of the control information or data packet may not overlap.

In one embodiment, CRC scrambling procedure for (CRC bits of) the control information or data packet using a first specific identity, a second specific identity, and a third specific identity could mean that the CRC bits of the control information or data packet is scrambled with the first specific identity, a second specific identity, and a third specific identity. Furthermore, CRC scrambling procedure for (CRC bits of) the control information or data packet using a first specific identity, a second specific identity, and a third specific identity could mean that the CRC bits of the control information or data packet is scrambled with the first specific identity, a second specific identity, and a third specific identity respectively. In addition, CRC scrambling procedure for (CRC bits of) the control information or data packet using a first specific identity, a second specific identity, and a third specific identity could mean that a first part of the CRC bits of the control information or data packet and the first specific identity are binary added per bit, a second part of the CRC bits of the control information or data packet and the second specific identity are binary added per bit, and a third part of the CRC bits of the control information or data packet and the third specific identity are binary added per bit. Also, CRC scrambling procedure for (CRC bits of) the control information or data packet using a first specific identity, a second specific identity, and a third specific identity could mean that a first part of the CRC bits of the control information or data packet and the first specific identity perform XOR operation per bit, a second part of the CRC bits of the control information or data packet and the second specific identity perform XOR operation per bit, and a third part of the CRC bits of the control information or data packet and the third specific identity perform XOR operation per bit.

In one embodiment, the first part of the CRC bits of the control information or data packet, the second part of the CRC bits of the control information or data packet, and the third part of the CRC bits of the control information or data packet may not be overlapped.

In one embodiment, scrambling procedure for the control information or data packet using a specific identity could mean that the (coded) sequence of the control information or data packet is scrambled with a scrambling sequence, wherein the scrambling sequence is generated upon the specific identity. The specific identity could be utilized to set initialization for generating the scrambling sequence.

In one embodiment, scrambling procedure for the control information or data packet using a first specific identity and a second specific identity could mean that the (coded) sequence of the control information or data packet is scrambled with a scrambling sequence, wherein the scrambling sequence is generated upon the first specific identity and the second specific identity. The first specific identity and the second specific identity could be utilized to set initialization for generating the scrambling sequence.

In one embodiment, scrambling procedure for the control information or data packet using a first specific identity, a second specific identity and a third specific identity could mean that the (coded) sequence of the control information or data packet is scrambled with a scrambling sequence, wherein the scrambling sequence is generated upon the first specific identity, the second specific identity and the third specific identity. The first specific identity, the second specific identity, and the third specific identity could be utilized to set initialization for generating the scrambling sequence.

In one embodiment, the scrambling sequence may be generated via a sequence generation given an initialization. The sequence generation may be pseudo-random sequence generation.

In one embodiment, the specific identity may mean one of the first part of the identity, the second part of the identity, the third part of the identity, and/or the identity. The first specific identity may mean one of the first part of the identity, the second part of the identity, the third part of the identity, and/or the identity. The second specific identity may mean one of the first part of the identity, the second part of the identity, the third part of the identity, and/or the identity. The third specific identity may mean one of the first part of the identity, the second part of the identity, the third part of the identity, and/or the identity.

In one embodiment, the data packet may be delivered on SL-SCH. The data packet may be delivered neither on DL-SCH nor on UL-SCH. The data packet may be transmitted on PSSCH. The data packet may be transmitted neither on PDSCH nor on PUSCH.

In one embodiment, the control information may mean sidelink control information. The control information may mean neither downlink control information nor uplink control information. The control information may be transmitted on PSCCH. The control information may be transmitted neither on PDCCH nor on PUCCH.

In one embodiment, the sidelink transmission or reception may be device-to-device transmission or reception. In particular, the sidelink transmission or reception may be V2X transmission or reception. Alternatively, the sidelink transmission or reception may be P2X transmission or reception. The sidelink transmission or reception may be on PC5 interface.

In one embodiment, the PC5 interface may be wireless interface for communication between device and device. Furthermore, the PC5 interface may be wireless interface for communication between UEs. In addition, the PC5 interface may be wireless interface for V2X or P2X communication.

In one embodiment, the Uu interface may be wireless interface for communication between network node and device. The Uu interface may also be wireless interface for communication between network node and UE.

In one embodiment, the device may be a UE. In particular, the device may be a vehicle UE. Alternatively, the device may be a V2X UE.

Methods a through g may be utilized to include or deliver partial or full source identity for sidelink transmission or reception. In other words, Methods a through g may be utilized to include or deliver partial or full identity of the transmitter device for sidelink transmission or reception. Thus, the receiving device can determine how to perform HARQ process and/or HARQ combining for a data packet, depending on the information of source identity and/or transmitter device's identity carried in associated control information(s).

More specifically, the concept of Method g is to deliver the source identity or the identity of the transmitter device using CRC scrambling for control information. However, if the bit number of the source identity or the identity of the transmitter device is larger than the bit number of the CRC bit of the control information, the method g may not work.

The general concept of Methods a, b, c1, c3, d, and e includes dividing the source identity or the identity of the transmitter device into two parts. The two parts may be delivered in any two of control information field, CRC scrambling for control information, data packet, and/or CRC scrambling for data packet.

The general concept of Methods c2 and f includes dividing the source identity or the identity of the transmitter device three parts. The three parts may be delivered in any three of control information field, CRC scrambling for control information, data packet, and/or CRC scrambling for data packet.

In another embodiment, the three parts of the source identity or the identity of the transmitter device may be delivered in control information field, data packet, and/or CRC scrambling for data packet. This embodiment may be included in Method e, wherein the identity comprises or consists of a first part of the identity, a second part of the identity, and the third party of the identity. Moreover, the third party of the identity may be included in the data packet.

In an additional embodiment, the three parts of the source identity or the identity of the transmitter device may be delivered in CRC scrambling for control information, data packet, and/or CRC scrambling for data packet. This additional embodiment may be included in method d, wherein the identity comprises or consists of a first part of the identity, a second part of the identity, and the third party of the identity. Moreover, the third party of the identity may be included in the data packet.

Moreover, the transmitter device may include or deliver partial or full destination identity for sidelink transmission or reception. In other words, the transmitter device may include or deliver partial or full identity of the receiving device for sidelink transmission or reception. Thus, the receiving device can determine how or whether to perform reception and/or decoding for a data transmission, depending on the information of destination identity and/or receiving device's identity.

In one embodiment, the receiving device may receive and/or decode a data transmission if the information of destination identity and/or receiving device's identity carried in associated control information indicates the receiving device itself. The receiving device may not receive and/or decode a data transmission if the information of destination identity and/or receiving device's identity carried in associated control information does not indicate the receiving device itself.

As shown in Methods A through L in FIG. 27, these methods may be used for including or delivering partial or full destination identity for sidelink transmission or reception.

Method A—A transmitting device may generate a data packet for sidelink transmission. The data packet may be associated with a destination identity. The destination identity may indicate a receiving device for receiving the data packet. Furthermore, the destination identity may comprise or consist of a first part of the destination identity and a second part of the destination identity.

In one embodiment, the transmitting device may include the first part of the destination identity in the control information. Furthermore, the transmitting device may attach CRC bits to the control information. In addition, the transmitting device may perform CRC scrambling procedure for (the CRC bits of) the control information using the second part of the destination identity. Also, the transmitting device may transmit the control transmission with the scrambled CRC bits. The receiving device may perform CRC scrambling procedure for (CRC bits of) the data packet using the destination identity. In one embodiment, the transmitting device may perform scrambling procedure for the data packet using the destination identity.

A receiving device may be (pre)configured or allocated with a destination identity. Preferably, the destination identity may comprise or consist of a first part of the destination identity and a second part of the destination identity. The receiving device may receive a control information with CRC bits. In one embodiment, the receiving device may perform CRC descrambling procedure for the CRC bits (of the control information) using the second part of the destination identity.

In one embodiment, the receiving device may perform CRC check using the descrambled CRC bits (for the control information). If the CRC check for the control information passes, the receiving device may check whether the control information indicates the first part of the destination identity. If the control information indicates the first part of the destination identity, the receiving device may decode a data packet based on the control information. In one embodiment, the data packet may be for sidelink transmission.

In one embodiment, the receiving device may perform descrambling procedure for the data packet using the destination identity. Furthermore, the receiving device may perform CRC descrambling procedure for (CRC bits of) the data packet using the destination identity. If the control information does not indicate the first part of the destination identity, the receiving device may not receive or decode a data packet based on the control information.

In one embodiment, the bit number of the second part of the destination identity may be limited as the bit number of the CRC bits of the control information. Furthermore, the bit number of the second part of the destination identity may be equal to or smaller than the bit number of the CRC bits of the control information.

Method B—A transmitting device may generate a data packet for sidelink transmission. The data packet may be associated with a destination identity. In one embodiment, the destination identity may indicate a receiving device for receiving the data packet. Furthermore, the destination identity may comprise or consist of a first part of the destination identity and a second part of the destination identity.

In one embodiment, the transmitting device may include the first part of the destination identity in the control information. Furthermore, the transmitting device may perform scrambling procedure for the control information using the second part of the destination identity. In addition, the transmitting device may perform scrambling procedure for the control information using the second part of the destination identity and the first part of the destination identity.

In one embodiment, the transmitting device may transmit the control transmission. The receiving device may perform CRC scrambling procedure for (CRC bits of) the data packet using the destination identity. Furthermore, the transmitting device may perform scrambling procedure for the data packet using the destination identity.

A receiving device may be (pre)configured or allocated with a destination identity. In one embodiment, the destination identity may comprise or consist of a first part of the destination identity and a second part of the destination identity. The receiving device may receive a control information.

In one embodiment, the transmitting device may perform descrambling procedure for the control information using the second part of the destination identity. Furthermore, the transmitting device may perform descrambling procedure for the control information using the second part of the destination identity and the first part of the destination identity.

In one embodiment, the receiving device may check whether the control information indicates the first part of the destination identity. If the control information indicates the first part of the destination identity, the receiving device may decode a data packet based on the control information. The data packet is for sidelink transmission.

In one embodiment, the receiving device may perform descrambling procedure for the data packet using the destination identity. Furthermore, the receiving device may perform CRC descrambling procedure for (CRC bits of) the data packet using the destination identity. If the control information does not indicate the first part of the destination identity, the receiving device may not receive or decode a data packet based on the control information.

Method C—A transmitting device may generate a data packet for sidelink transmission. The data packet may be associated with a destination identity. In one embodiment, the destination identity is to indicate a receiving device for receiving the data packet. The destination identity may comprise or consist of a first part of the destination identity and a second part of the destination identity.

In one embodiment, the transmitting device may include the second part of the destination identity in the data packet. Furthermore, the transmitting device may include the first part of the destination identity in the control information.

In one embodiment, the transmitting device may transmit the control transmission. Furthermore, the receiving device may perform CRC scrambling procedure for (CRC bits of) the data packet using the first part of the destination identity. In addition, the transmitting device may perform scrambling procedure for the data packet using the first part of the destination identity.

A receiving device may be (pre)configured or allocated with a destination identity. In one embodiment, the destination identity may comprise or consist of a first part of the destination identity and a second part of the destination identity.

The receiving device may receive a control information. In one embodiment, the receiving device may check whether the control information indicates the first part of the destination identity. If the control information indicates the first part of the destination identity, the receiving device may decode a data packet based on the control information. The data packet may be for sidelink transmission.

In one embodiment, the receiving device may perform descrambling procedure for the data packet using the first part of the destination identity. Furthermore, the receiving device may perform CRC descrambling procedure for (CRC bits of) the data packet using the first part of the destination identity. If the control information does not indicate the first part of the destination identity, the receiving device may not receive or decode a data packet based on the control information.

In one embodiment, the receiving device may check whether the data packet indicates the second part of the destination identity. If the data packet does not indicate the second part of the destination identity, the receiving device may discard the data packet.

Method D—A transmitting device may generate a data packet for sidelink transmission. The data packet may be associated with a destination identity. In one embodiment, the destination identity may indicate a receiving device for receiving the data packet. Furthermore, the destination identity may comprise or consist of a first part of the destination identity and a second part of the destination identity.

In one embodiment, the transmitting device may include the first part of the destination identity in the control information. The transmitting device may also transmit the control transmission.

In one embodiment, the receiving device may perform CRC scrambling procedure for (CRC bits of) the data packet using the second part of the destination identity. Furthermore, the receiving device may perform CRC scrambling procedure for (CRC bits of) the data packet using the second part of the destination identity and the first part of the destination identity.

In one embodiment, the transmitting device may perform scrambling procedure for the data packet using the first part of the destination identity. Furthermore, the transmitting device may perform scrambling procedure for the data packet using the first part of the destination identity and the second part of the destination identity.

A receiving device may be (pre)configured or allocated with a destination identity. In one embodiment, the destination identity may comprise or consist of a first part of the destination identity and a second part of the destination identity.

The receiving device may receive a control information. In one embodiment, the receiving device may check whether the control information indicates the first part of the destination identity. If the control information indicates the first part of the destination identity, the receiving device may decode a data packet based on the control information. The data packet may be for sidelink transmission.

In one embodiment, the receiving device may perform descrambling procedure for the data packet using the first part of the destination identity. Furthermore, the receiving device may perform descrambling procedure for the data packet using the first part of the destination identity and the second part of the destination identity.

In one embodiment, the receiving device may perform CRC descrambling procedure for (CRC bits of) the data packet using the second part of the destination identity. Furthermore, the receiving device may perform CRC descrambling procedure for (CRC bits of) the data packet using the second part of the destination identity and the first part of the destination identity. If the control information does not indicate the first part of the destination identity, the receiving device may not receive or decode a data packet based on the control information.

In one embodiment, the bit number of the second part of the destination identity may be limited as the bit number of the CRC bits of the data packet. Furthermore, the bit number of the second part of the destination identity may be equal to or smaller than the bit number of the CRC bits of the data packet.

Method E—A transmitting device may generate a data packet for sidelink transmission. The data packet may be associated with a destination identity. In one embodiment, the destination identity may indicate a receiving device for receiving the data packet. Furthermore, the destination identity may comprise or consist of a first part of the destination identity and a second part of the destination identity.

In one embodiment, the transmitting device may attach CRC bits to the control information. Furthermore, the transmitting device may perform CRC scrambling procedure for (the CRC bits of) the control information using the first part of the destination identity.

In one embodiment, the transmitting device may perform scrambling procedure for the control information using the second part of the destination identity. Furthermore, the transmitting device may perform scrambling procedure for the control information using the second part of the destination identity and the first part of the destination identity.

In one embodiment, the transmitting device may transmit the control transmission with the scrambled CRC bits. The receiving device may perform CRC scrambling procedure for (CRC bits of) the data packet using the second part of the destination identity and the first part of the destination identity. The transmitting device may perform scrambling procedure for the data packet using the first part of the destination identity and the second part of the destination identity.

A receiving device may be (pre)configured or allocated with a destination identity. In one embodiment, the destination identity may comprise or consist of a first part of the destination identity and a second part of the destination identity. The receiving device may receive a control information with CRC bits.

In one embodiment, the transmitting device may perform descrambling procedure for the control information using the second part of the destination identity. Furthermore, the transmitting device may perform descrambling procedure for the control information using the second part of the destination identity and the first part of the destination identity.

In one embodiment, the receiving device may perform CRC descrambling procedure for the CRC bits (of the control information) using the first part of the destination identity. Furthermore, the receiving device may perform CRC check using the descrambled CRC bits (for the control information). If the CRC check for the control information passes, the receiving device may decode a data packet based on the control information. The data packet may be for sidelink transmission.

In one embodiment, the receiving device may perform descrambling procedure for the data packet using the first part of the destination identity and the second part of the destination identity. Furthermore, the receiving device may perform CRC descrambling procedure for (CRC bits of) the data packet using the second part of the destination identity and the first part of the destination identity.

In one embodiment, the bit number of the second part of the destination identity may be limited as the bit number of the CRC bits of the control information. Furthermore, the bit number of the second part of the destination identity may be equal to or smaller than the bit number of the CRC bits of the control information.

Method F—A transmitting device may generate a data packet for sidelink transmission. The data packet may be associated with a destination identity. In one embodiment, the destination identity may indicate a receiving device for receiving the data packet. Furthermore, the destination identity may comprise or consist of a first part of the destination identity and a second part of the destination identity.

In one embodiment, the transmitting device may include the second part of the destination identity in the data packet. Furthermore, the transmitting device may attach CRC bits to the control information. In addition, the transmitting device may perform CRC scrambling procedure for (the CRC bits of) the control information using the first part of the destination identity.

In one embodiment, the transmitting device may transmit the control transmission with the scrambled CRC bits. The receiving device may perform CRC scrambling procedure for (CRC bits of) the data packet using the first part of the destination identity. The transmitting device may perform scrambling procedure for the data packet using the first part of the destination identity.

A receiving device may be (pre)configured or allocated with a destination identity. In one embodiment, the destination identity may comprise or consist of a first part of the destination identity and a second part of the destination identity.

The receiving device may receive a control information with CRC bits. In one embodiment, the receiving device may perform CRC descrambling procedure for the CRC bits (of the control information) using the first part of the destination identity. Furthermore, the receiving device may perform CRC check using the descrambled CRC bits (for the control information). If the CRC check for the control information passes, the receiving device may decode a data packet based on the control information. The data packet is for sidelink transmission.

In one embodiment, the receiving device may perform descrambling procedure for the data packet using the first part of the destination identity. Furthermore, the receiving device may perform CRC descrambling procedure for (CRC bits of) the data packet using the first part of the destination identity. In addition, the receiving device may check whether the data packet indicates the second part of the destination identity. If the data packet does not indicate the second part of the destination identity, the receiving device may discard the data packet.

In one embodiment, the bit number of the second part of the destination identity may be limited as the bit number of the CRC bits of the control information. Furthermore, the bit number of the second part of the destination identity may be equal to or smaller than the bit number of the CRC bits of the control information.

Method G—A transmitting device may generate a data packet for sidelink transmission. The data packet may be associated with a destination identity. In one embodiment, the destination identity may indicate a receiving device for receiving the data packet. Furthermore, the destination identity may comprise or consist of a first part of the destination identity and a second part of the destination identity.

In one embodiment, the transmitting device may attach CRC bits to the control information. Furthermore, the transmitting device may perform CRC scrambling procedure for (the CRC bits of) the control information using the first part of the destination identity.

In one embodiment, the transmitting device may transmit the control transmission with the scrambled CRC bits. The receiving device may perform CRC scrambling procedure for (CRC bits of) the data packet using the second part of the destination identity. Furthermore, the receiving device may perform CRC scrambling procedure for (CRC bits of) the data packet using the second part of the destination identity and the first part of the destination identity.

In one embodiment, the transmitting device may perform scrambling procedure for the data packet using the first part of the destination identity. Furthermore, the transmitting device may perform scrambling procedure for the data packet using the first part of the destination identity and the second part of the destination identity.

A receiving device may be (pre)configured or allocated with a destination identity. The destination identity may comprise or consist of a first part of the destination identity and a second part of the destination identity.

The receiving device may receive a control information with CRC bits. In one embodiment, the receiving device may perform CRC descrambling procedure for the CRC bits (of the control information) using the first part of the destination identity. Furthermore, the receiving device may perform CRC check using the descrambled CRC bits (for the control information). If the CRC check for the control information passes, the receiving device may decode a data packet based on the control information. The data packet is for sidelink transmission.

In one embodiment, the receiving device may perform descrambling procedure for the data packet using the first part of the destination identity. Furthermore, the receiving device may perform descrambling procedure for the data packet using the first part of the destination identity and the second part of the destination identity.

In one embodiment, the receiving device may perform CRC descrambling procedure for (CRC bits of) the data packet using the second part of the destination identity. Furthermore, the receiving device may perform CRC descrambling procedure for (CRC bits of) the data packet using the second part of the destination identity and the first part of the destination identity.

In one embodiment, the bit number of the second part of the destination identity may be limited as the bit number of the CRC bits of the control information. Furthermore, the bit number of the second part of the destination identity may be equal to or smaller than the bit number of the CRC bits of the control information.

Method H—A transmitting device may generate a data packet for sidelink transmission. The data packet may be associated with a destination identity. In one embodiment, the destination identity may indicate a receiving device for receiving the data packet. Furthermore, the destination identity may comprise or consist of a first part of the destination identity, a second part of the destination identity and a third part of the destination identity.

In one embodiment, the transmitting device may include the first part of the destination identity in the control information. Furthermore, the transmitting device may attach CRC bits to the control information. In addition, the transmitting device may perform CRC scrambling procedure for (the CRC bits of) the control information using the second part of the destination identity.

In one embodiment, the transmitting device may perform scrambling procedure for the control information using the third part of the destination identity. Furthermore, the transmitting device may perform scrambling procedure for the control information using the third part of the destination identity, the second part of the destination identity and the first part of the destination identity.

In one embodiment, the transmitting device may transmit the control transmission with the scrambled CRC bits. The receiving device may perform CRC scrambling procedure for (CRC bits of) the data packet using the third part of the destination identity, the second part of the destination identity and the first part of the destination identity. The transmitting device may perform scrambling procedure for the data packet using the third part of the destination identity, the first part of the destination identity and the second part of the destination identity.

A receiving device may be (pre)configured or allocated with a destination identity. In one embodiment, the destination identity may comprise or consist of a first part of the destination identity, a second part of the destination identity and the third part of the destination identity. The receiving device may receive a control information with CRC bits.

In one embodiment, the transmitting device may perform descrambling procedure for the control information using the third part of the destination identity. Furthermore, the transmitting device may perform descrambling procedure for the control information using the third part of the destination identity, the second part of the destination identity and the first part of the destination identity.

In one embodiment, the receiving device may perform CRC descrambling procedure for the CRC bits (of the control information) using the second part of the destination identity. Furthermore, the receiving device may perform CRC check using the descrambled CRC bits (for the control information). If the CRC check for the control information passes, the receiving device may check whether the control information indicates the first part of the destination identity. If the control information indicates the first part of the destination identity, the receiving device may decode a data packet based on the control information. The data packet may be for sidelink transmission.

In one embodiment, the receiving device may perform descrambling procedure for the data packet using the third part of the destination identity, the first part of the destination identity and the second part of the destination identity. Furthermore, the receiving device may perform CRC descrambling procedure for (CRC bits of) the data packet using the third part of the destination identity, second part of the destination identity and the first part of the destination identity. If the control information does not indicate the first part of the destination identity, the receiving device may not receive or decode a data packet based on the control information.

In one embodiment, the bit number of the second part of the destination identity may be limited as the bit number of the CRC bits of the control information. Furthermore, the bit number of the second part of the destination identity may be equal to or smaller than the bit number of the CRC bits of the control information.

Method I—A transmitting device may generate a data packet for sidelink transmission. The data packet may be associated with a destination identity. In one embodiment, the destination identity is to indicate a receiving device for receiving the data packet. Furthermore, the destination identity may comprise or consist of a first part of the destination identity, a second part of the destination identity and a third part of the destination identity.

In one embodiment, the transmitting device may include the third part of the destination identity in the data packet. Furthermore, the transmitting device may include the first part of the destination identity in the control information.

In one embodiment, the transmitting device may attach CRC bits to the control information. Furthermore, the transmitting device may perform CRC scrambling procedure for (the CRC bits of) the control information using the second part of the destination identity.

In one embodiment, the transmitting device may transmit the control transmission with the scrambled CRC bits. Furthermore, the receiving device may perform CRC scrambling procedure for (CRC bits of) the data packet using the first part of the destination identity and the second part of the destination identity. In addition, the transmitting device may perform scrambling procedure for the data packet using the first part of the destination identity and the second part of the destination identity.

A receiving device may be (pre)configured or allocated with a destination identity. In one embodiment, the destination identity may comprise or consist of a first part of the destination identity, a second part of the destination identity and the third part of the destination identity.

The receiving device may receive a control information with CRC bits. In one embodiment, the receiving device may perform CRC descrambling procedure for the CRC bits (of the control information) using the second part of the destination identity. Furthermore, the receiving device may perform CRC check using the descrambled CRC bits (for the control information). If the CRC check for the control information passes, the receiving device may check whether the control information indicates the first part of the destination identity. If the control information indicates the first part of the destination identity, the receiving device may decode a data packet based on the control information. The data packet may be for sidelink transmission.

In one embodiment, the receiving device may perform descrambling procedure for the data packet using the first part of the destination identity and the second part of the destination identity. Furthermore, the receiving device may perform CRC descrambling procedure for (CRC bits of) the data packet using the first part of the destination identity and the second part of the destination identity. If the control information does not indicate the first part of the destination identity, the receiving device may not receive or decode a data packet based on the control information.

In one embodiment, the receiving device may check whether the data packet indicates the third part of the destination identity. If the data packet does not indicate the third part of the destination identity, the receiving device may discard the data packet.

In one embodiment, the bit number of the second part of the destination identity may be limited as the bit number of the CRC bits of the control information. Furthermore, the bit number of the second part of the destination identity may be equal to or smaller than the bit number of the CRC bits of the control information.

Method J—A transmitting device may generate a data packet for sidelink transmission. The data packet may be associated with a destination identity. In one embodiment, the destination identity may indicate a receiving device for receiving the data packet. Furthermore, the destination identity may comprise or consist of a first part of the destination identity, a second part of the destination identity and a third part of the destination identity.

In one embodiment, the transmitting device may include the first part of the destination identity in the control information. Furthermore, the transmitting device may attach CRC bits to the control information. In addition, the transmitting device may perform CRC scrambling procedure for (the CRC bits of) the control information using the second part of the destination identity.

In one embodiment, the transmitting device may transmit the control transmission with the scrambled CRC bits. The receiving device may perform CRC scrambling procedure for (CRC bits of) the data packet using the third part of the destination identity. Furthermore, the receiving device may perform CRC scrambling procedure for (CRC bits of) the data packet using the third part of the destination identity, the second part of the destination identity and the first part of the destination identity.

In one embodiment, the transmitting device may perform scrambling procedure for the data packet using the first part of the destination identity and the second part of the destination identity. Furthermore, the transmitting device may perform scrambling procedure for the data packet using the third part of the destination identity, the first part of the destination identity and the second part of the destination identity.

A receiving device may be (pre)configured or allocated with a destination identity. In one embodiment, the destination identity may comprise or consist of a first part of the destination identity, a second part of the destination identity and the third part of the destination identity.

The receiving device may receive a control information with CRC bits. In one embodiment, the receiving device may perform CRC descrambling procedure for the CRC bits (of the control information) using the second part of the destination identity. Furthermore, the receiving device may perform CRC check using the descrambled CRC bits (for the control information). If the CRC check for the control information passes, the receiving device may check whether the control information indicates the first part of the destination identity. If the control information indicates the first part of the destination identity, the receiving device may decode a data packet based on the control information. The data packet may be for sidelink transmission.

In one embodiment, the receiving device may perform descrambling procedure for the data packet using the first part of the destination identity and the second part of the destination identity. Furthermore, the receiving device may perform descrambling procedure for the data packet using the third part of the destination identity, the first part of the destination identity and the second part of the destination identity.

In one embodiment, the receiving device may perform CRC descrambling procedure for (CRC bits of) the data packet using the third part of the destination identity. Furthermore, the receiving device may perform CRC descrambling procedure for (CRC bits of) the data packet using the third part of the destination identity, second part of the destination identity, and the first part of the destination identity. If the control information does not indicate the first part of the destination identity, the receiving device may not receive or decode a data packet based on the control information.

In one embodiment, the bit number of the second part of the destination identity may be limited as the bit number of the CRC bits of the control information. Furthermore, the bit number of the second part of the destination identity may be equal to or smaller than the bit number of the CRC bits of the control information.

Method K—A transmitting device may generate a data packet for sidelink transmission. The data packet may be associated with a destination identity. In one embodiment, the destination identity is to indicate a receiving device for receiving the data packet.

In one embodiment, the transmitting device may attach CRC bits to the control information. Furthermore, the transmitting device may perform CRC scrambling procedure for (the CRC bits of) the control information using the destination identity.

In one embodiment, the transmitting device may transmit the control transmission with the scrambled CRC bits. The receiving device may perform CRC scrambling procedure for (CRC bits of) the data packet using the destination identity. The transmitting device may perform scrambling procedure for the data packet using the destination identity.

A receiving device may be (pre)configured or allocated with a destination identity. The receiving device may receive a control information with CRC bits. Furthermore, the receiving device may perform CRC descrambling procedure for the CRC bits (of the control information) using the destination identity. In addition, the receiving device may perform CRC check using the descrambled CRC bits (for the control information). If the CRC check for the control information passes, the receiving device may decode a data packet based on the control information. The data packet may be for sidelink transmission.

In one embodiment, the receiving device may perform descrambling procedure for the data packet using the destination identity. Furthermore, the receiving device may perform CRC descrambling procedure for (CRC bits of) the data packet using the destination identity.

In one embodiment, the bit number of the destination identity may be limited as the bit number of the CRC bits of the control information. Furthermore, the bit number of the destination identity may be equal to or smaller than the bit number of the CRC bits of the control information.

Method L—A transmitting device may generate a data packet for sidelink transmission. The data packet may be associated with a destination identity. The destination identity may indicate a receiving device for receiving the data packet.

In one embodiment, the transmitting device may include the destination identity in the data packet. Furthermore, the transmitting device may perform scrambling procedure for the control information using the destination identity.

In one embodiment, the transmitting device may transmit the control transmission. The receiving device may perform CRC scrambling procedure for (CRC bits of) the data packet using the destination identity. The transmitting device may perform scrambling procedure for the data packet using the destination identity.

A receiving device may be (pre)configured or allocated with a destination identity. Furthermore, the receiving device may receive a control information. In addition, the transmitting device may perform descrambling procedure for the control information using the destination identity. Also, the receiving device may decode a data packet based on the control information. The data packet may be for sidelink transmission.

In one embodiment, the receiving device may perform descrambling procedure for the data packet using the destination identity. Furthermore, the receiving device may perform CRC descrambling procedure for (CRC bits of) the data packet using the destination identity. In addition, the receiving device may check whether the data packet indicates the destination identity. If the data packet does not indicate the destination identity, the receiving device may discard the data packet.

In summary, Methods a through g may be utilized to include or deliver partial or full source ID for sidelink transmission or reception. In other words, Methods a though g may be utilized to include or deliver partial or full identity of the transmitter device for sidelink transmission or reception. Methods A through L may be utilized to include or deliver partial or full destination ID for sidelink transmission or reception. In other words, Methods A through L may be utilized to include or deliver partial or full identity of the receiver device for sidelink transmission or reception.

For all above methods for sidelink transmission or reception, Methods a through g for including or delivering partial or full source ID, and Methods A through L for including or delivering partial or full destination ID may be combined for including or delivering both the partial or full source ID and the partial or full destination ID. In other words, Methods a through g for including or delivering partial or full identity of the transmitter device, and Methods A through L for including or delivering partial or full identity of the receiver device may be combined for including or delivering both the partial or full identity of the transmitter device and the partial or full identity of the receiver device.

In one embodiment, the destination identity may mean destination layer-2 identity. Furthermore, the destination identity may mean the identity of the receiving device. In addition, the destination identity is utilized to indicate which device needs to receive the control information and/or the data packet.

In one embodiment, a receiving device may have multiple identities for itself. Furthermore, a receiving device may have multiple destination layer-2 identities.

Any combination of Method a through g and Method A through L may be a possible embodiment.

FIG. 29 shows some combined instances of Method a through g and Method A through L. Thus, the transmitter device may indicate or deliver both the partial or full source ID and the partial or full destination ID via transmission of the control information and transmission of the data packet. In other words, the transmitter device may indicate or deliver both the partial or full identity of the transmitter device and the partial or full identity of the receiver device via transmission of the control information and transmission of the data packet.

More specifically, it is possible that the control information includes (a part of) source identity and (a part of) destination identity. In one embodiment, a field in the control information may indicate (the part of) source identity and another field in the control information may indicate (the part of) destination identity.

More specifically, it is possible to perform CRC scrambling procedure for (CRC bits of) the control information or data packet using (a part of) source identity and (a part of) destination identity.

In one embodiment, the CRC bits of the control information or data packet may be scrambled with (the part of) source identity and (the part of) destination identity. Furthermore, the CRC bits of the control information or data packet, (the part of) source identity and (the part of) destination identity may be binary added per bit. In addition, the CRC bits of the control information or data packet, (the part of) source identity and (the part of) destination identity may perform XOR operation per bit. Also, the CRC bits of the control information or data packet may be scrambled with the binary addition result of (the part of) source identity and (the part of) destination identity. Alternatively, the CRC bits of the control information or data packet may be scrambled with (the part of) source identity and (the part of) destination identity respectively.

In one embodiment, a first part of the CRC bits of the control information or data packet and (the part of) source identity may be binary added per bit, and a second part of the CRC bits of the control information or data packet and (the part of) destination identity may be binary added per bit. Furthermore, a first part of the CRC bits of the control information or data packet and (the part of) source identity may perform XOR operation per bit, and a second part of the CRC bits of the control information or data packet and (the part of) destination identity may perform XOR operation per bit.

In one embodiment, the first part of the CRC bits of the control information or data packet and the second part of the CRC bits of the control information or data packet may not be overlapped. Alternatively, the first part of the CRC bits of the control information or data packet and the second part of the CRC bits of the control information or data packet may overlap.

More specifically, it is possible to perform scrambling procedure for the control information or data packet using (a part of) source identity and (a part of) destination identity. In one embodiment, the (coded) sequence of the control information or data packet may be scrambled with a scrambling sequence, wherein the scrambling sequence is generated upon (the part of) source identity and (the part of) destination identity. Furthermore, (the part of) source identity and (the part of) destination identity may be used to set initialization for generating the scrambling sequence. In addition, (the part of) source identity and (the part of) destination identity may be jointly used to set initialization for generating the scrambling sequence.

In one embodiment, the scrambling sequence may be generated via a sequence generation given an initialization. Furthermore, the sequence generation may be pseudo-random sequence generation.

In one embodiment, the part of source identity may mean any of the first part of the identity, the second part of the identity, the third part of the identity, and/or the identity. Furthermore, the part of source identity may mean any of the first part of the source identity, the second part of the source identity, the third part of the source identity, and/or the source identity. In addition, the part of destination identity may mean any of the first part of the destination identity, the second part of the destination identity, the third part of the destination identity, and/or the destination identity.

In one embodiment, the transmitting device may transmit the data packet. Furthermore, the transmitting device may generate a control information associated with the data packet. The data packet may mean a MAC PDU or a data packet.

As shown in Methods a, b, d, and e in FIG. 25, the first part of the identity may be S1 and the second part of the identity may be S2. The identity S may comprise or consist of S1 and S2. The S1 and S2 are exclusive parts of the identity S. In one embodiment, the bit number of S, noted as ns, is the same as summation of the bit number of S1, noted as $n_{S1}$, and the bit number of S2, noted as $n_{S2}$. S1 is $n_{S1}$ most significant bits of the identity S, and S2 is $n_{S2}$ least significant bits of the identity S. Alternatively, S1 is $n_{S1}$ least significant bits of the identity S, and S2 is $n_{S2}$ most significant bits of the identity S.

As shown in Methods a, b, c1, c3, d, and e in FIG. 26, the first part of the identity may be 8 bits of the identity, and the second part of the identity may be 16 bits of the identity. The identity may be 24 bits. In one embodiment, the first part of the identity is 8 most significant bits of the identity, and the second part of the identity is 16 least significant bits of the identity. Alternatively, the first part of the identity is 8 least significant bits of the identity, and the second part of the identity is 16 most significant bits of the identity.

As shown in Methods a and d in FIG. 26, the first part of the identity may be 16 bits of the identity, and the second part of the identity may be 8 bits of the identity. The identity may be 24 bits. In one embodiment, the first part of the identity is 16 most significant bits of the identity, and the second part of the identity is 8 least significant bits of the identity. Alternatively, the first part of the identity is 16 least significant bits of the identity, and the second part of the identity is 8 most significant bits of the identity.

As shown in Methods c2 and f in FIG. 26, the first part of the identity may be 8 bits of the identity, the second part of the identity may be 8 bits of the identity, and the third part of the identity may be 8 bits of the identity. The identity may be 24 bits.

As shown in Methods A, B, C, D, E, F, and G in FIG. 27, the first part of the destination identity may be D1 and the second part of the destination identity may be D2. In one embodiment, the destination identity D may comprise or consist of D1 and D2. The D1 and D2 are exclusive parts of the destination identity D. The bit number of D, noted as $n_D$, is the same as summation of the bit number of D1, noted as $n_{D1}$, and the bit number of D2, noted as $n_{D2}$. In one embodiment, D1 is $n_{D1}$ most significant bits of the destination identity D, and D2 is $n_{D2}$ least significant bits of the destination identity D. Alternatively, D1 is $n_{D1}$ least significant bits of the destination identity D, and D2 is $n_{D2}$ most significant bits of the destination identity D.

As shown in methods H, I, and J in FIG. 27, the first part of the destination identity may be D1, the second part of the destination identity may be D2, and the third part of the destination identity may be D3. In one embodiment, the destination identity D may comprise or consist of D1, D2, and D3. D1, D2, and D3 are exclusive parts of the destination identity D. In one embodiment, the bit number of D, noted as $n_D$, is the same as summation of the bit number of D1, noted as $n_{D1}$, and the bit number of D2, noted as $n_{D2}$, and the bit number of D3, noted as $n_{D3}$.

As shown in Methods A, B, C, and D in FIG. 28, the first part of the destination identity may be 8 bits of the destination identity, and the second part of the destination identity may be 16 bits of the destination identity. The destination identity may be 24 bits. In one embodiment, the first part of the destination identity is 8 most significant bits of the destination identity, and the second part of the destination identity is 16 least significant bits of the destination identity. Alternatively, the first part of the destination identity is 8 least significant bits of the destination identity, and the second part of the destination identity is 16 most significant bits of the destination identity.

Figure 30:
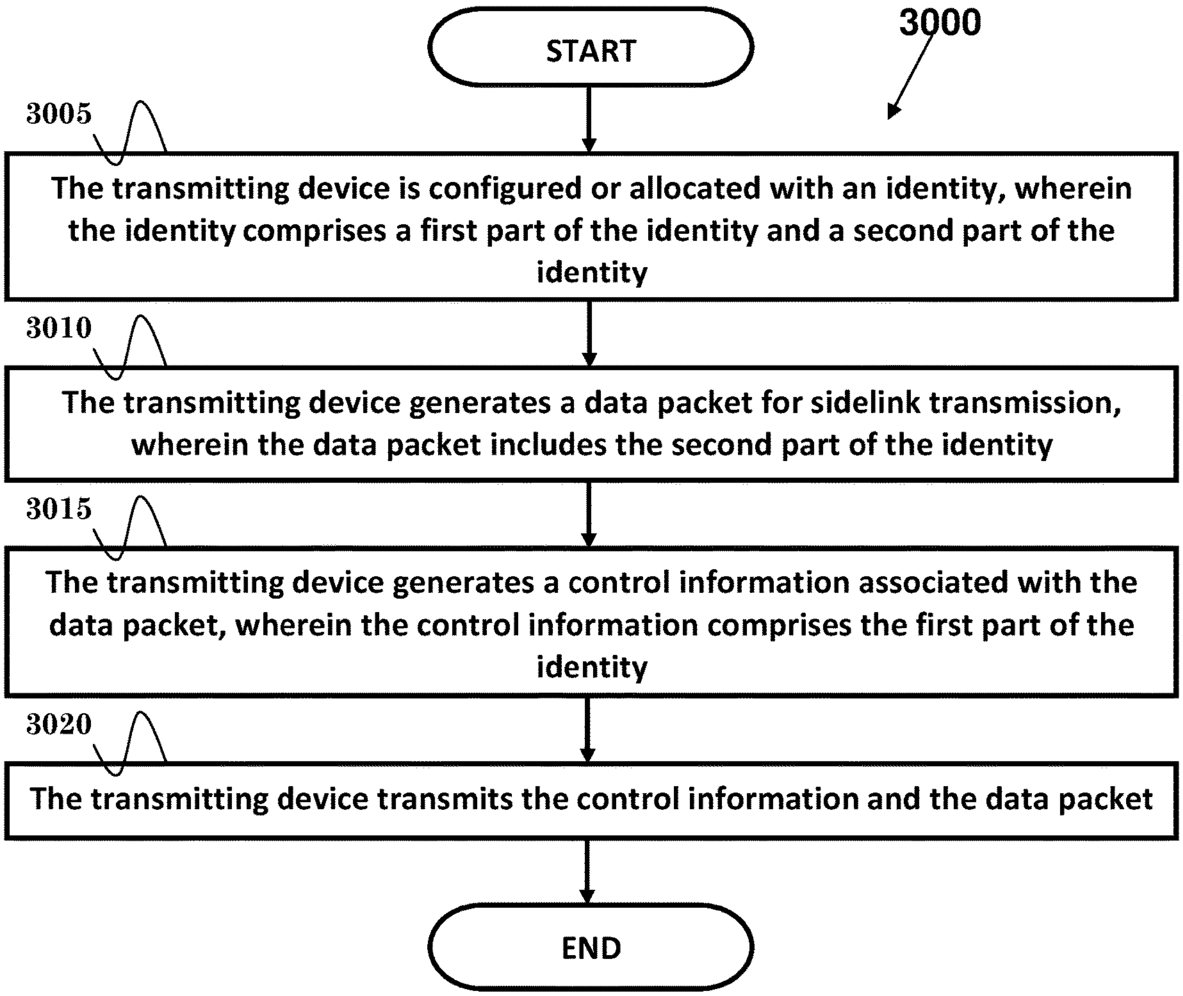
FIG. 30 is a flow chart according to one exemplary embodiment.

As shown in Methods E, F, and G in FIG. 30, the first part of the destination identity may be 16 bits of the destination identity, and the second part of the destination identity may be 8 bits of the destination identity. The destination identity may be 24 bits. In one embodiment, the first part of the destination identity is 16 most significant bits of the destination identity, and the second part of the destination identity is 8 least significant bits of the destination identity. Alternatively, the first part of the destination identity is 16 least significant bits of the destination identity, and the second part of the destination identity is 8 most significant bits of the destination identity.

As shown in Methods H, I, and J in FIG. 28, the first part of the destination identity may be 8 bits of the destination identity, the second part of the destination identity may be 8 bits of the destination identity, and the third part of the destination identity may be 8 bits of the destination identity. The destination identity may be 24 bits.

In one embodiment, to ensure the reliability of the control information, the bit number of control information may be limited. Thus, the bit number of the first part of the destination identity may not be so larger. For instance, the bit number of the first part of the destination identity may be equal to or smaller than 8.

In one embodiment, the bit number of the first part of the destination identity may not be so small, to avoid/eliminate the error case of destination misdetection. For instance, the bit number of the first part of the destination identity may be equal to or larger than 4.

As shown in Methods K and L in FIGS. 27 and 28, the destination identity D may be 24 bits. Alternatively, the destination identity D may be 16 bits.

FIG. 30 is a flow chart 3000 according to one exemplary embodiment from the perspective of a transmitting device. In step 3005, the transmitting device is configured or allocated with an identity, wherein the identity comprises a first part of the identity and a second part of the identity. In step 3010, the transmitting device generates a data packet for sidelink transmission, wherein the data packet includes the second part of the identity. In step 3015, the transmitting device generates a control information associated with the data packet, wherein the control information comprises the first part of the identity. In step 3020, the transmitting device transmits the control information and the data packet.

In one embodiment, the transmitting device could transmit the control information and the data packet to at least a receiving device, wherein the data packet is associated with a destination identity.

In one embodiment, the destination identity comprises a first part of the destination identity and a second part of the destination identity. The transmitting device may include the second part of the destination identity in the data packet. Furthermore, the transmitting device may include the first part of the destination identity in the control information.

In one embodiment, the destination identity comprises a first part of the destination identity and a second part of the destination identity. The transmitting device may include the second part of the destination identity in the data packet. The transmitting device could perform CRC scrambling procedure for (the CRC bits of) the control information using the first part of the destination identity.

In one embodiment, the transmitting device may perform CRC scrambling procedure for (the CRC bits of) the control information using the destination identity. The identity may be layer-2 source identity, and/or the identity may be the identity of the transmitting device.

In one embodiment, the destination identity may be layer-2 destination identity, and/or the destination identity may be the identity of the receiving device. The destination identity may (be utilized to) indicate which receiving device needs to receive the control information and/or the data packet.

In one embodiment, the first part of the identity (is utilized to) assist receiving device to perform HARQ combining for the data packet.

Referring back to FIGS. 3 and 4, in one exemplary embodiment of a transmitting device, the device 300 includes a program code 312 stored in the memory 310. The CPU 308 could execute program code 312 to enable the transmitting device (i) to be configured or allocated with an identity, wherein the identity comprises a first part of the identity and a second part of the identity, (ii) to generate a data packet for sidelink transmission, wherein the data packet includes the second part of the identity, (iii) to generate a control information associated with the data packet, wherein the control information comprises the first part of the identity, and (iv) to transmit the control information and the data packet. Furthermore, the CPU 308 can execute the program code 312 to perform all of the above-described actions and steps or others described herein.

Figure 31:
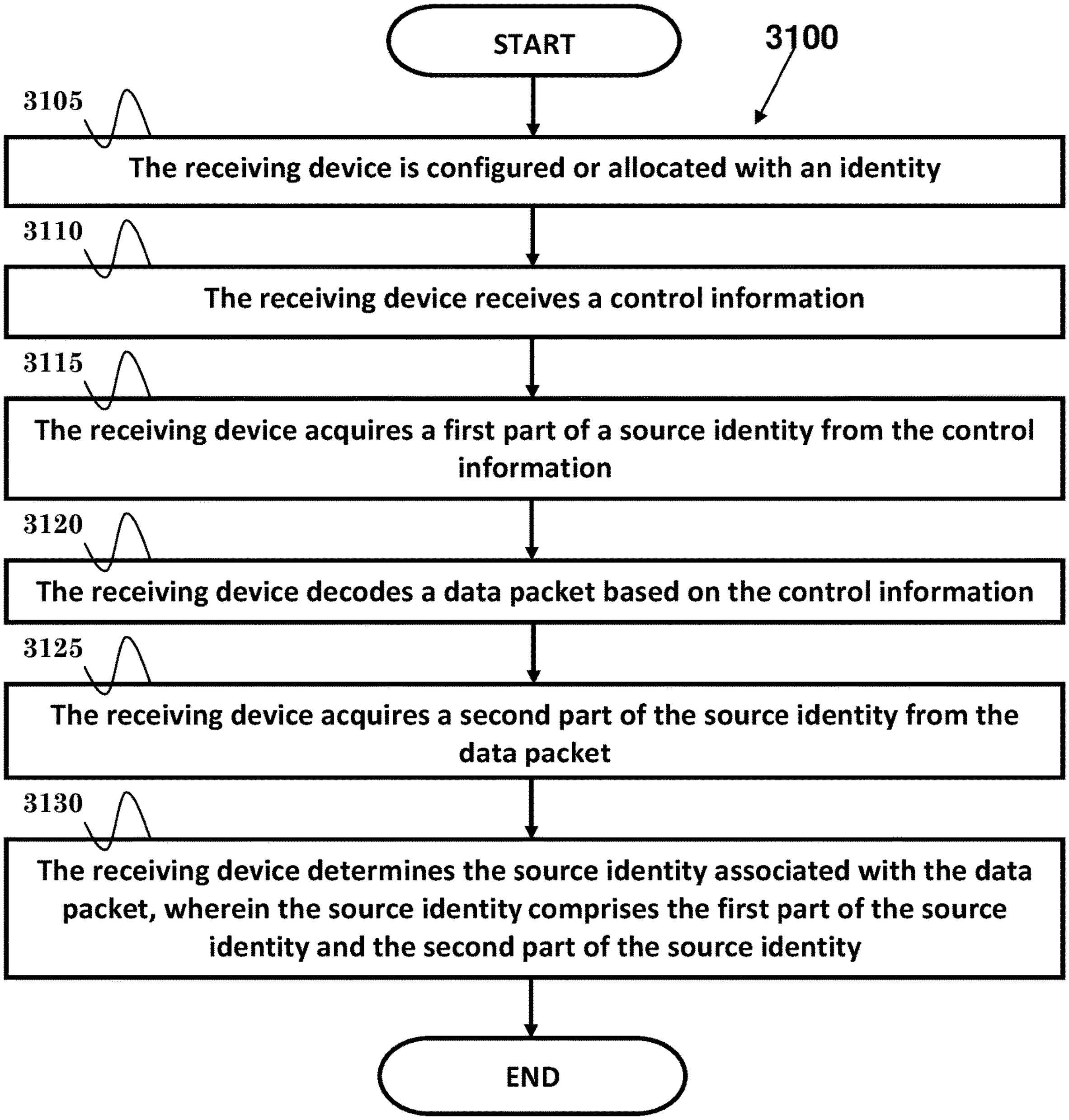
FIG. 31 is a flow chart according to one exemplary embodiment.

FIG. 31 is a flow chart 3100 according to one exemplary embodiment from the perspective of a receiving device. In step 3105, the receiving device is configured or allocated with an identity. In step 3110, the receiving device receives a control information. In step 3115, the receiving device acquires a first part of a source identity from the control information. In step 3120, the receiving device decodes a data packet based on the control information. In step 3125, the receiving device acquires a second part of the source identity from the data packet. In step 3130, the receiving device determines the source identity associated with the data packet, wherein the source identity comprises the first part of the source identity and the second part of the source identity.

In one embodiment, the identity comprises a first part of the identity and a second part of the identity. Furthermore, the receiving device may check whether the control information indicates the first part of the identity. In addition, if the control information indicates the first part of the identity, the receiving device may decode the data packet based on the control information, and checks whether the data packet indicates the second part of the identity.

In one embodiment, the identity comprises a first part of the identity and a second part of the identity. Furthermore, the receiving device could perform CRC descrambling procedure for CRC bits of the control information using the first part of the identity. In addition, if the CRC check for the control information passes, the receiving device could decode the data packet based on the control information, and checks whether the data packet indicates the second part of the identity.

In one embodiment, the receiving device could perform CRC descrambling procedure for CRC bits of the control information using the identity. If the CRC check for the control information passes, the receiving device decodes the data packet based on the control information.

In one embodiment, the identity may be layer-2 destination identity, and/or the identity may be the identity of the receiving device. Furthermore, the source identity may be layer-2 source identity, and/or the source identity may be the identity of a transmitting device, wherein the transmitting device transmits the control information and the data packet.

In one embodiment, (the first part of) the identity may (be utilized to) indicate whether the receiving device needs to receive the control information and/or the data packet. Furthermore, the first part of the source identity may (be utilized to) assist the receiving device to perform HARQ combining for the data packet.

Referring back to FIGS. 3 and 4, in one exemplary embodiment of a receiving device, the device 300 includes a program code 312 stored in the memory 310. The CPU 308 could execute program code 312 to enable the receiving device (i) to be configured or allocated with an identity, (ii) to receive a control information, (iii) to acquire a first part of a source identity from the control information, (iv) to decode a data packet based on the control information, (v) to acquire a second part of the source identity from the data packet, and (vi) to determine the source identity associated with the data packet, wherein the source identity comprises the first part of the source identity and the second part of the source identity. Furthermore, the CPU 308 can execute the program code 312 to perform all of the above-described actions and steps or others described herein.

Figure 32:
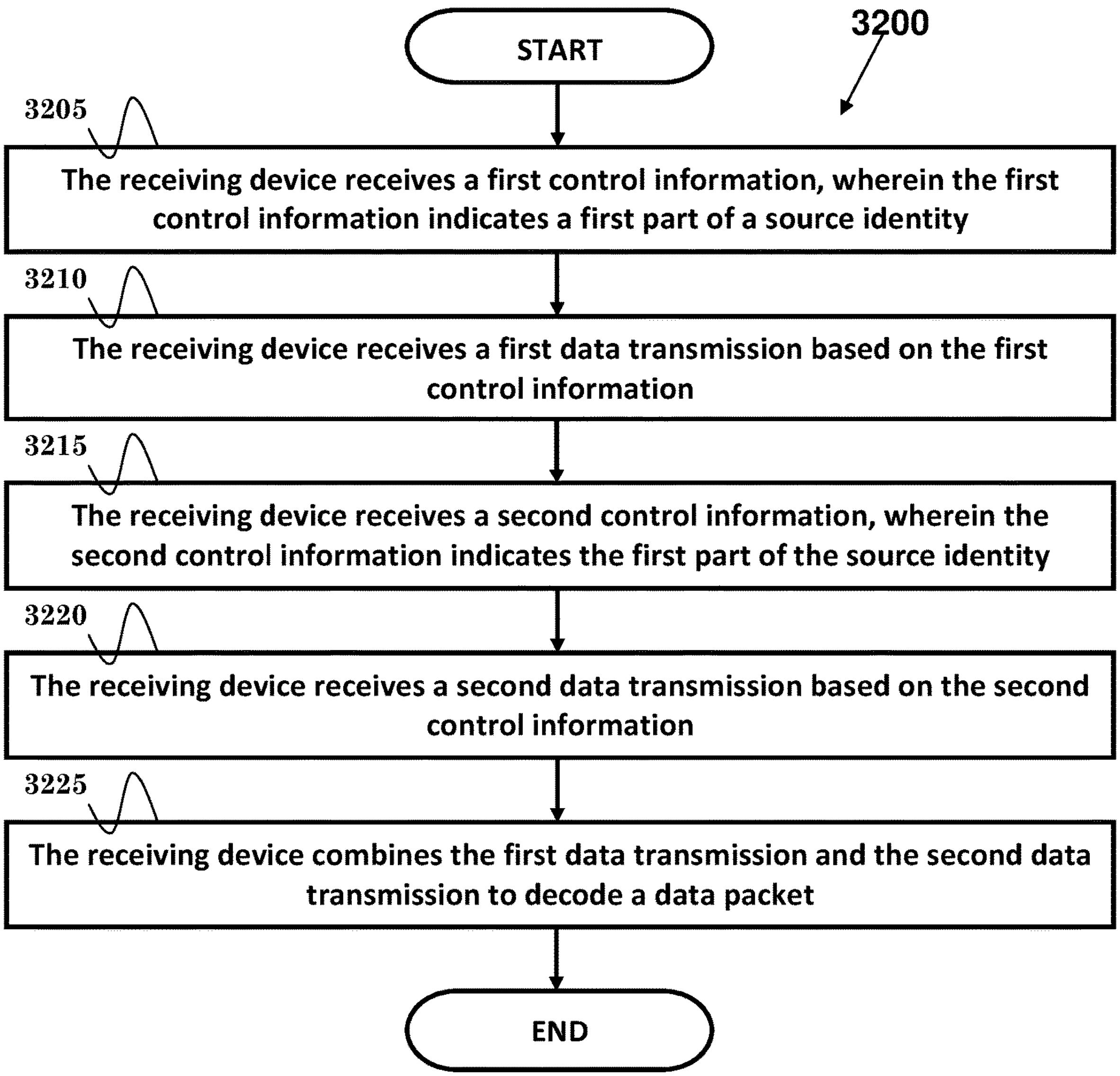
FIG. 32 is a flow chart according to one exemplary embodiment.

FIG. 32 is a flow chart 3200 according to one exemplary embodiment from the perspective of a receiving device. In step 3205, the receiving device receives a first control information, wherein the first control information indicates a first part of a source identity. In step 3210, the receiving device receives a first data transmission based on the first control information. In step 3215, the receiving device receives a second control information, wherein the second control information indicates the first part of the source identity. In step 3220, the receiving device receives a second data transmission based on the second control information. In step 3225, the receiving device combines the first data transmission and the second data transmission to decode a data packet.

In one embodiment, the receiving device may acquire a second part of the source identity from the data packet. Furthermore, the receiving device may determine the source identity associated with the data packet, wherein the source identity comprises the first part of the source identity and the second part of the source identity.

In one embodiment, the receiving device may receive a third control information, wherein the third control information indicates a first part of another source identity, and the first part of another source identity is different from the first part of the source identity. Furthermore, the receiving device may prevent from combining the first data transmission and the third data transmission to decode a data packet.

Referring back to FIGS. 3 and 4, in one exemplary embodiment of a receiving device, the device 300 includes a program code 312 stored in the memory 310. The CPU 308 could execute program code 312 to enable the receiving device (i) to receive a first control information, wherein the first control information indicates a first part of a source identity, (ii) to receive a first data transmission based on the first control information, (iii) to receive a second control information, wherein the second control information indicates the first part of the source identity, (iv) to receive a second data transmission based on the second control information, and (v) to combine the first data transmission and the second data transmission to decode a data packet. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a transmitting device having an identity that is a layer-2 identity of the transmitting device, comprising:

the transmitting device generates a data packet for sidelink transmission associated with the identity of the transmitting device, wherein the identity of the transmitting device is split between (i) a second part of the identity of the transmitting device comprised in the data packet and (ii) a first part of the identity of the transmitting device to be comprised in a control information associated with the data packet;

the transmitting device generates the control information associated with the data packet for sidelink transmission; and the transmitting device transmits:

the control information comprising the first part of the identity of the transmitting device, wherein the control information does not comprise the second part of the identity of the transmitting device; and the data packet comprising the second part of the identity of the transmitting device, wherein the data packet does not comprise the first part of the identity of the transmitting device.

2. The method of claim 1, wherein at least one of:

the data packet is associated with a destination identity; or the destination identity comprises a first part of the destination identity and a second part of the destination identity.

3. The method of claim 2, further comprising:

the transmitting device includes the second part of the destination identity in the data packet; and the transmitting device includes the first part of the destination identity in the control information.

4. The method of claim 2, further comprising:

the transmitting device includes the second part of the destination identity in the data packet; and the transmitting device performs CRC (Cyclic Redundancy Check) scrambling procedure for CRC bits of the control information using the first part of the destination identity.

5. The method of claim 1, wherein:

the data packet comprises a first field indicating the second part of the identity of the transmitting device; and the control information comprises a second field indicating the first part of the identity of the transmitting device.

6. The method of claim 1, wherein:

the identity of the transmitting device is a source layer-2 identity.

7. The method of claim 2, wherein at least one of:

the destination identity is a destination layer-2 identity; or the destination identity is the identity of a receiving device, wherein the transmitting device transmits the control information and the data packet to at least the receiving device.

8. The method of claim 2, wherein at least one of the first part of the destination identity or the destination identity is utilized to indicate which receiving device needs to receive at least one of the control information or the data packet.

9. The method of claim 1, wherein the first part of the identity of the transmitting device is utilized to assist receiving device to perform HARQ (Hybrid Automatic Repeat Request) combining for the data packet.

10. A method of a receiving device, with an identity, to perform sidelink reception, comprising:

the receiving device receives a control information which comprises a first part of the identity, wherein the control information does not comprise a second part of the identity;

the receiving device acquires a first part of a source identity from the control information;

the receiving device decodes a data packet, which comprises the second part of the identity and does not comprise the first part of the identity, based on the control information;

the receiving device acquires a second part of the source identity from the data packet; and the receiving device determines the source identity associated with the data packet, wherein the source identity comprises the first part of the source identity from the control information and the second part of the source identity from the data packet.

11. The method of claim 10, further comprising:

responsive to the control information indicating the first part of the identity, the receiving device decodes the data packet based on the control information, and checks whether the data packet comprises the second part of the identity.

12. The method of claim 10, further comprising:

the receiving device performs CRC (Cyclic Redundancy Check) descrambling procedure for CRC bits of the control information using the first part of the identity; and when a CRC for the control information passes, the receiving device decodes the data packet based on the control information, and checks whether the data packet comprises the second part of the identity.

13. The method of claim 10, further comprising:

the receiving device acquires the first part of the source identity from a second field included in the control information, and the receiving device acquires the second part of the source identity from a first field included in the data packet.

14. The method of claim 10, wherein at least one of:

the identity is a destination layer-2 identity; or the identity is the identity of the receiving device.

15. The method of claim 10, wherein at least one of the identity or the first part of the identity is utilized to indicate whether the receiving device needs to receive at least one of the control information or the data packet.

16. The method of claim 10, wherein the first part of the source identity is utilized to assist the receiving device to perform HARQ (Hybrid Automatic Repeat Request) combining for the data packet.

17. A transmitting device having an identity that is a layer-2 identity of the transmitting device, comprising:

a control circuit;

a processor installed in the control circuit; and a memory installed in the control circuit and operatively coupled to the processor, wherein the processor is configured to execute a program code stored in the memory to perform operations, the operations comprising:

generating a data packet for sidelink transmission associated with the identity of the transmitting device, wherein the identity of the transmitting device is split between (i) a second part of the identity of the transmitting device comprised in the data packet and (ii) a first part of the identity of the transmitting device to be comprised in a control information associated with the data packet;

generating the control information associated with the data packet for sidelink transmission; and transmitting:

the control information comprising the first part of the identity of the transmitting device, wherein the control information does not comprise the second part of the identity of the transmitting device; and the data packet comprising the second part of the identity of the transmitting device, wherein the data packet does not comprise the first part of the identity of the transmitting device.

18. The transmitting device of claim 17, wherein at least one of:

the data packet is associated with a destination identity; or the destination identity comprises a first part of the destination identity and a second part of the destination identity, the operations further comprising:

including the second part of the destination identity in the data packet; and including the first part of the destination identity in the control information.

19. The transmitting device of claim 17, wherein:

the data packet comprises a first field indicating the second part of the identity of the transmitting device; and the control information comprises a second field indicating the first part of the identity of the transmitting device.

* * * * *